(12) United States Patent
Kim et al.

(10) Patent No.: US 12,444,226 B2
(45) Date of Patent: Oct. 14, 2025

(54) ELECTRONIC DEVICE INCLUDING BIOMETRIC AUTHENTICATION DEVICE

(71) Applicant: Samsung Electronics Co., Ltd., Suwon-si (KR)

(72) Inventors: Dongchurl Kim, Suwon-si (KR); Jinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/672,582

(22) Filed: May 23, 2024

(65) Prior Publication Data

US 2024/0312242 A1    Sep. 19, 2024

Related U.S. Application Data

(63) Continuation of application No. PCT/KR2022/018664, filed on Nov. 24, 2022.

(30) Foreign Application Priority Data

Nov. 25, 2021  (KR) .................. 10-2021-0164198

(51) Int. Cl.
  *G06V 40/13*  (2022.01)
  *G06F 21/32*  (2013.01)
  *H04R 1/02*  (2006.01)

(52) U.S. Cl.
  CPC .......... *G06V 40/1318* (2022.01); *G06F 21/32* (2013.01); *H04R 1/02* (2013.01)

(58) Field of Classification Search
  CPC ....................................................... H04R 1/02
  See application file for complete search history.

(56) References Cited

U.S. PATENT DOCUMENTS 9,897,696 B2    2/2018  Lee et al.
10,719,681 B2   7/2020  Lee et al.
(Continued)

FOREIGN PATENT DOCUMENTS

CN    105072229 A    11/2015
CN    107506704 A    12/2017
(Continued)

OTHER PUBLICATIONS

International Search Report dated Mar. 2, 2023, issued in International Patent Application No. PCT/KR2022/018664.
(Continued)

*Primary Examiner* — Joseph R Haley
(74) *Attorney, Agent, or Firm* — Jefferson IP Law, LLP

(57) ABSTRACT

An electronic device including a biometric authentication device is provided. The electronic device includes a display, a substrate assembly, a speaker enclosure which includes at least a part of a fingerprint recognition area, a first support member configured to support at least a portion of the display and the substrate assembly, and a second support member configured to support at least a portion of the substrate assembly and the speaker enclosure, wherein the first support member includes an opening corresponding to the fingerprint recognition area, and wherein the fingerprint recognition area includes a plurality of lenses which spaced apart from a rear surface of the display by a first distance, and a plurality of image sensors spaced apart from the plurality of lenses by a second distance.

15 Claims, 13 Drawing Sheets

(56) References Cited

U.S. PATENT DOCUMENTS

| | | | |
|---|---|---|---|
| 10,762,320 B2 | 9/2020 | Kho et al. | |
| 10,798,475 B2 | 10/2020 | Park et al. | |
| 2017/0119262 A1 | 5/2017 | Shim et al. | |
| 2017/0300736 A1 | 10/2017 | Song et al. | |
| 2018/0139389 A1* | 5/2018 | Park | H04N 23/51 |
| 2019/0246190 A1 | 8/2019 | Park et al. | |
| 2020/0186180 A1 | 6/2020 | Park et al. | |
| 2020/0272802 A1 | 8/2020 | Jo et al. | |
| 2020/0292741 A1 | 9/2020 | Rhee et al. | |
| 2021/0174048 A1 | 6/2021 | Song et al. | |
| 2021/0319199 A1 | 10/2021 | Jiang et al. | |
| 2022/0230011 A1* | 7/2022 | Wan | G06V 40/1318 |

FOREIGN PATENT DOCUMENTS

| | | |
|---|---|---|
| CN | 207926673 U | 9/2018 |
| KR | 10-2017-0049279 A | 5/2017 |
| KR | 10-2017-0119623 A | 10/2017 |
| KR | 10-2019-0036194 A | 4/2019 |
| KR | 10-2019-0053732 A | 5/2019 |
| KR | 10-2019-0095632 A | 8/2019 |
| KR | 10-2020-0104463 A | 9/2020 |
| KR | 10-2021-0040897 A | 4/2021 |

OTHER PUBLICATIONS

Extended European Search Report dated Jan. 27, 2025, issued in a European Patent Application No. 22899045.3.

* cited by examiner

ELECTRONIC DEVICE INCLUDING BIOMETRIC AUTHENTICATION DEVICE

CROSS-REFERENCE TO RELATED APPLICATION(S)

This application is a continuation application, claiming priority under § 365(c), of an International application No. PCT/KR2022/018664, filed on Nov. 24, 2022, which is based on and claims the benefit of a Korean patent application number 10-2021-0164198, filed on Nov. 25, 2021, in the Korean Intellectual Property Office, the disclosure of which is incorporated by reference herein in its entirety.

BACKGROUND

1. Field

The disclosure relates to an electronic device including a biometric authentication device.

2. Description of Related Art

Methods of using a user's fingerprint to perform biometric authentication for the user are increasing. Fingerprints have the advantages of not being inconvenient to carry, having little risk of being stolen or counterfeited, and not changing much throughout life. Fingerprint recognition devices that acquire images of such fingerprints include an optical fingerprint recognition device, an ultrasonic fingerprint recognition device, and the like.

The optical fingerprint recognition device may perform biometric authentication of a user by detecting light emitted from a display, reflected from a fingerprint, and then entering the recognition device. In the optical fingerprint recognition device, since the number of features that may be secured from a fingerprint shape increases as the image area increases, fingerprint recognition performance and security performance may be improved.

The above information is presented as background information only to assist with an understanding of the disclosure. No determination has been made, and no assertion is made, as to whether any of the above might be applicable as prior art with regard to the disclosure.

SUMMARY

When the fingerprint recognition area of the optical fingerprint recognition device is increased, it is possible to improve fingerprint recognition performance and security performance. However, when an optical fingerprint recognition device is added to an electronic device in order to increase the fingerprint recognition area of the optical fingerprint recognition device, it is difficult to secure a mounting space in the electronic device.

Aspects of the disclosure are to address at least the above-mentioned problems and/or disadvantages and to provide at least the advantages described below. Accordingly, an aspect of the disclosure is to provide an electronic device including a biometric authentication device and a biometric authentication area while securing a mounting space.

Another aspect of the disclosure is to add an optical fingerprint recognition device to an electronic device including a biometric authentication device by using a speaker enclosure.

In accordance with an aspect of the disclosure, an electronic device including a biometric authentication device is provided. The electronic device includes a display, a substrate assembly, a speaker enclosure including at least a portion of a fingerprint recognition area, a first support member configured to support at least a portion of the display and the substrate assembly, and a second support member configured to support at least a portion of the substrate assembly and the speaker enclosure, wherein the first support member includes an opening corresponding to the fingerprint recognition area, wherein the fingerprint recognition area includes a plurality of lenses spaced apart from the rear surface of the display by a first distance, and a plurality of image sensors spaced apart from the plurality of lenses by a second distance.

In an electronic device including a biometric authentication device according to various embodiment, by increasing a fingerprint recognition area by disposing a plurality of optical fingerprint recognition devices, it is possible to improve fingerprint recognition performance and security performance.

In an electronic device including a biometric authentication device according to various embodiments, by disposing a plurality of optical fingerprint recognition devices by using a speaker enclosure, it is possible to secure a mounting space within the electronic device.

In an electronic device including a biometric authentication device according to various embodiments, by using a speaker enclosure and a plurality of optical fingerprint recognition devices at the same time, it is possible to increase the volume of the speaker enclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
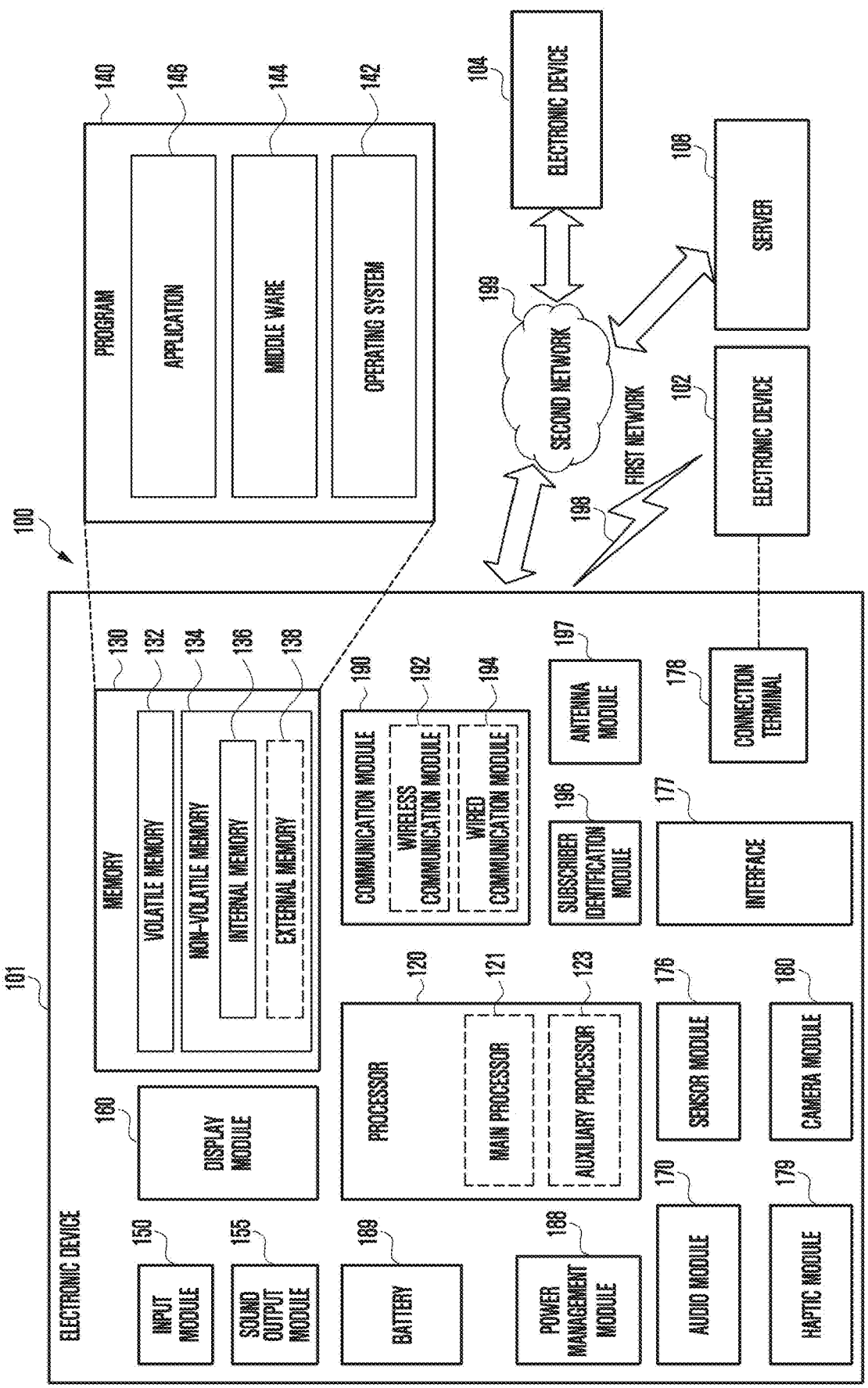
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 includes, for example, a microphone, a mouse, a keyboard, a key (e.g., a button), or a digital pen (e.g., a stylus pen).

The sound output module 155 may output sound signals to the outside of the electronic device 101. The sound output module 155 includes, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 includes, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 includes, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 includes, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 includes, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 is implemented as at least part of, for example, a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips)

separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, is selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, requests the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
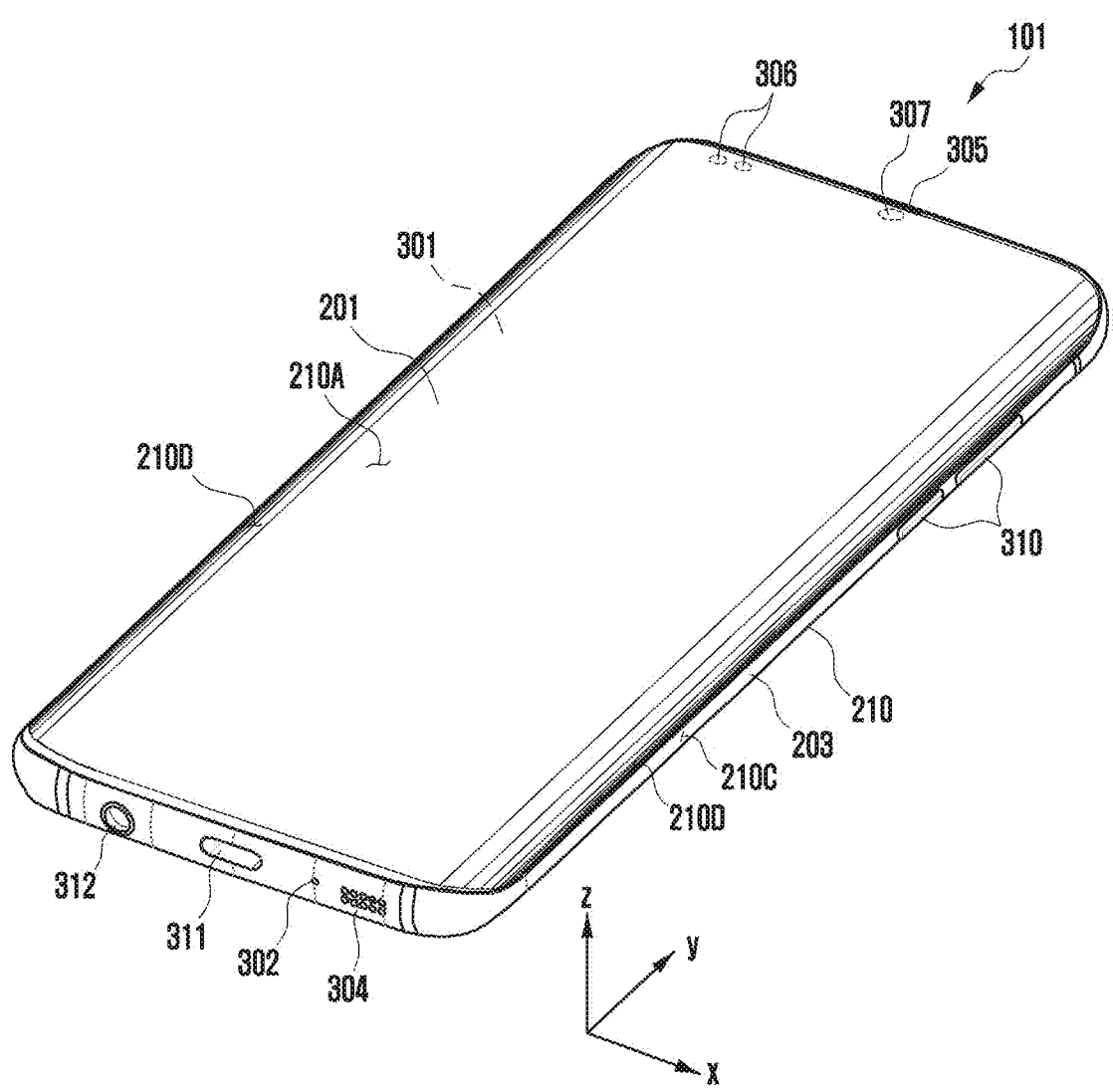
FIG. 2 is a front perspective view of an electronic device according to an embodiment of the disclosure.

FIG. 2 is a front perspective view of an electronic device according to an embodiment of the disclosure.

Figure 3:
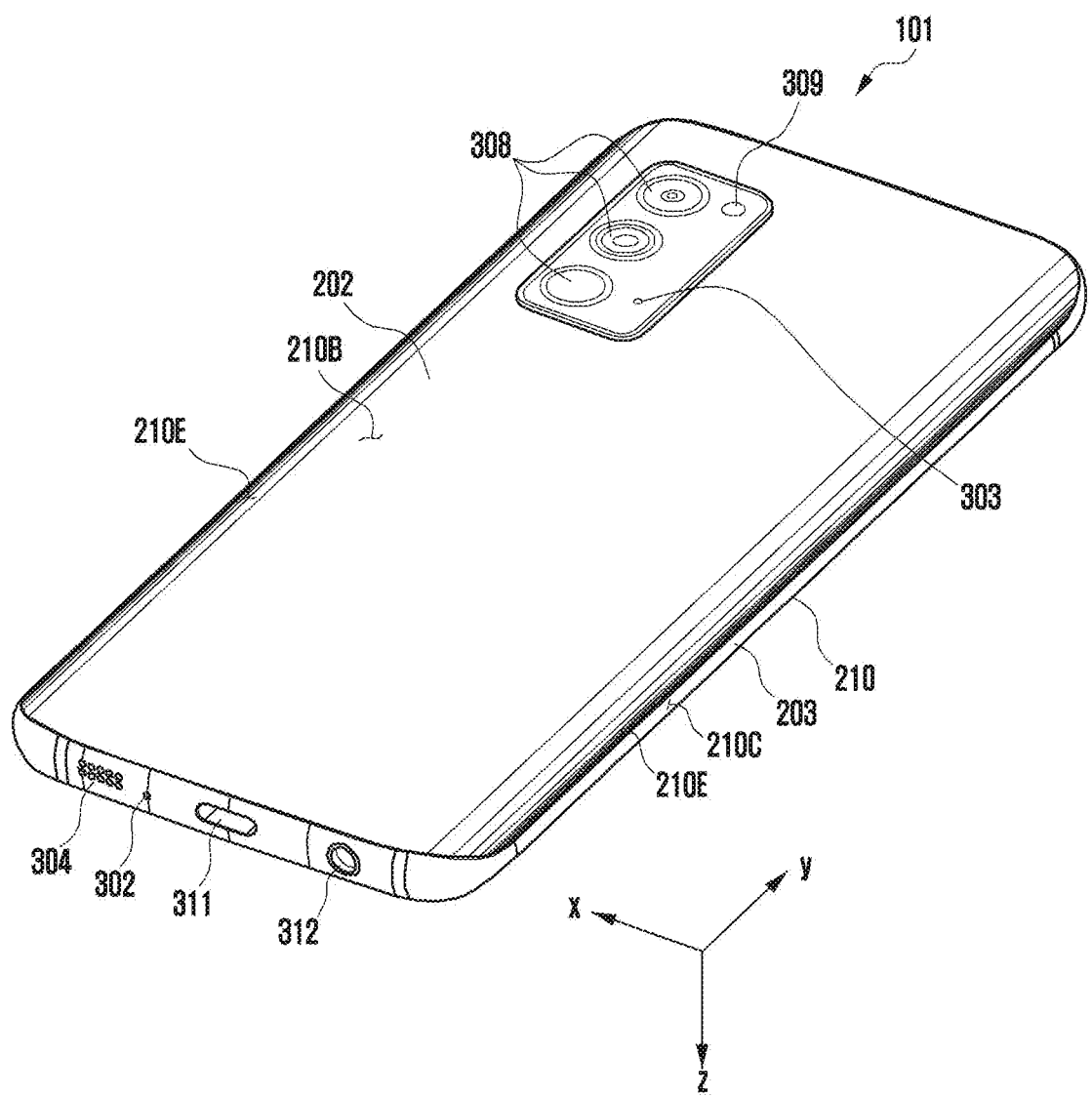
FIG. 3 is a rear perspective view of the electronic device of FIG. 2 according to an embodiment of the disclosure.

FIG. 3 is a rear perspective view of the electronic device 101 of FIG. 2 according to an embodiment of the disclosure.

Referring to FIGS. 2 and 3, in an embodiment, an electronic device 101 (e.g., the electronic device 101 in FIG. 1) may include a housing 210 including a first surface (or the front surface) 210A, a second surface (or the rear surface) 210B, and a side surface 210C surrounding the space between the first surface 210A and the second surface 210B. In some embodiments, the housing 210 may refer to a structure defining at least a portion of the first surface 210A, the second surface 210B, and the third surface 210C. At least a portion of the first surface 210A may be defined by a substantially transparent front surface plate (or a first plate) 201 (e.g., a glass plate or a polymer plate including various coating layers). The second surface 210B may be defined by a substantially opaque rear surface plate (or a second plate) 202. The rear surface plate 202 is made of, for example, coated or colored glass, ceramic, polymer, metal (e.g., aluminum, stainless steel (STS), or magnesium), or a combination of two or more of these materials. The side surface 210C may be defined by a side surface bezel structure (or a "side surface structure") 203 coupled to the front surface plate 201 and the rear surface plate 202, and the side surface bezel structure 203 may include metal and/or polymer. In some embodiments, the rear surface plate 202 and the side surface bezel structure 203 may be integrally configured, and may include the same material (e.g., a metal material such as aluminum).

In an embodiment, the front surface plate 201 may include two first areas 210D, which are bent from the first surface 210A toward the rear surface plate 202 and extend seamlessly. The first areas 210D may be disposed adjacent to opposite long edges of the front surface plate 201, respectively. The rear surface plate 202 may include two second areas 210E, which are bent from the second surface 210B toward the front surface plate 201 and extend seamlessly. The second areas 210E may be disposed adjacent to opposite long edges of the rear surface plate 202, respectively. The side surface 210C may have a first thickness (or width) (e.g., a height in the z-axis direction) on the sides where the first areas 210D and the second areas 210E are not located, and may have a second thickness smaller than the first thickness on the sides where the first areas 210D and the second areas 210E are located. In some embodiments, the front surface plate 201 may be implemented to include one of the first areas 210D or may be implemented without the curved first areas 210D. In some embodiments, the rear surface plate 202 may be implemented to include one of the second areas 210E or may be implemented without the curved second areas 210E.

According to an embodiment, the electronic device 101 may include at least one of a display 301, a first audio module 302, a second audio module 303, a third audio module 304, a fourth audio module 305, a sensor module 306, a first camera module 307, a plurality of second camera modules 308, a light-emitting module 309, an input module 310, a first connection terminal module 311, or a second connection terminal module 312. In some embodiments, at least one of the above-mentioned components may be omitted from the electronic device 101 or other components may be additionally included in the electronic device 101.

A display area (e.g., a screen display area or an active area) of the display 301 is visually exposed through, for example, the front surface plate 201. In an embodiment, the electronic device 101 may be implemented to maximize the display area visible through the front surface plate 201 (e.g., a large screen or a full screen). For example, the display 301 is implemented to have a periphery having substantially the same shape as the shape of the periphery of the front surface plate 201. As another example, the distance between the periphery of the display 301 and the periphery of the front surface plate 201 may be substantially constant. In an embodiment, the display 301 may include a touch detection circuit. In some embodiments, the display 301 may include a pressure sensor capable of measuring the intensity (pressure) of a touch. In some embodiments, the display 301 may be coupled to or located adjacent to a digitizer (e.g., an electromagnetic induction panel) configured to detect a magnetic field-type electronic pen (e.g., a stylus pen).

The first audio module 302 includes, for example, a first microphone located inside the electronic device 101 and a first microphone hole provided in the side surface 210C to correspond to the first microphone. The second audio module 303 includes, for example, a second microphone (or a second microphone module) located inside the electronic device 101 and a second microphone hole provided in the second surface 210B to correspond to the second microphone. The positions or number of audio modules in terms of the microphones may vary without being limited to the illustrated example. In some embodiments, the electronic device 101 may include a plurality of microphones used to detect the direction of sound.

The third audio module 304 includes, for example, a first speaker (or a first speaker module) located inside the electronic device 101 and a first speaker hole provided in the side surface 210C to correspond to the first speaker. The fourth audio module 305 includes, for example, a second speaker (or a second speaker module) located inside the electronic device 101 and a second speaker hole provided in the first surface 210A to correspond to the second speaker. In an embodiment, the first speaker may include an external speaker. In an embodiment, the second speaker may include a receiver for a call, and the second speaker hole may be referred to as a receiver hole. The positions or number of third audio modules 304 or fourth audio modules 305 may vary without being limited to the illustrated example. In some embodiments, the microphone hole and the speaker hole may be implemented as a single hole. In some embodiments, the third audio module 304 or the fourth audio module 305 may include a piezo speaker in which the speaker hole is omitted.

The sensor module 306 generates electrical signals or data values corresponding to, for example, the internal operating states or the external environmental states of the electronic device 101. In an embodiment, the sensor module 306 may include an optical sensor located inside the electronic device 101 to correspond to the first surface 210A. The optical sensor includes, for example, a proximity sensor or an illuminance sensor. The optical sensor may be aligned with an opening provided in the display 301. External light may be introduced into the optical sensor through the front surface plate 201 and the opening in the display 301. In some embodiments, the optical sensor may be disposed at the lower end of the display 301, and may perform its relevant functions without being visually distinguished (or exposed) as to its position. For example, the optical sensor is located on the rear surface of the display 301, or below or beneath the display 301. In some embodiments, the optical sensor may be located to be aligned with a recess provided in the rear surface of the display 301. The optical sensor may be disposed to overlap at least a portion of the screen to perform a sensing function without being exposed to the outside. In this case, a partial area of the display 301 that at least partially overlaps the optical sensor may include a pixel structure and/or a wiring structure different from those of other areas. For example, the partial area of the display 301 that at least partially overlaps the optical sensor may have a pixel density different from those of other areas. In some embodiments, a plurality of pixels may not be disposed in the partial area of the display 301 that at least partially overlaps the optical sensor. In some embodiments, the electronic device 101 may include a biometric sensor (e.g., a fingerprint sensor) located below the display 301. Biometric sensors may be implemented in an optical type or an ultrasonic type, and the positions or number of biometric sensors may vary. The electronic device 101 may further include at least one of various other sensor modules, such as a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

The first camera module 307 (e.g., a front camera module) may be located inside the electronic device 101 to correspond to, for example, the first surface 210A. The plurality of second camera modules 308 (e.g., rear camera modules) may be located inside the electronic device 101 to correspond to, for example the second surface 210B. The first camera module 307 and/or the plurality of second camera modules 308 may include one or more lenses, an image sensor, and/or an image signal processor. The positions or number of first camera modules or second camera modules may vary without being limited to the illustrated example.

According to an embodiment, the display 301 may include an opening aligned with the first camera module 307. External light may reach the first camera module 307 through the front surface plate 201 and the opening in the display 301. In some embodiments, the opening of the display 301 may be provided in the form of a notch depending on the position of the first camera module 307. According to some embodiments, the first camera module 307 may be disposed at the lower end of the display 301 and may perform its relevant functions (e.g., image capture) without being visually distinguished (or exposed) as to its position. For example, the first camera module 307 is located on the rear surface of the display 301 or below or beneath the display 301 and may include a camera hidden behind the display (e.g., an under display camera (UDC)). In some embodiments, the first camera module 307 may be located to be aligned with the recess provided in the rear surface of the display 301. The first camera module 307 may be disposed to overlap at least a portion of the screen to acquire an image of an external subject without being visually exposed to the outside. In this case, a partial area of the display 301 that at least partially overlaps the first camera module 307 may include a pixel structure and/or a wiring structure different from those of other areas. For example, the partial area of the display 301 that at least partially overlaps the first camera module 307 has a pixel density different from those of other areas. The pixel structure and/or the wiring structure provided in the partial area of the display 301 that at least partially overlaps the first camera module 307 may reduce light loss between the outside and the first camera module 307. In some embodiments, pixels may not be disposed in the partial area of the display 301 that at least partially overlaps the first camera module 307. In some embodiments, the electronic device 101 may further include a light-emitting module (e.g., a light source) located inside the electronic device 101 to correspond to the first surface 210A. The light-emitting module provides, for example, the status information of the electronic device 101 in an optical form. In some embodiments, the light-emitting module may provide a light source that operates in conjunction with the operation of the first camera module 307. The light-emitting module includes, for example, an LED, an IR LED, or a xenon lamp.

According to an embodiment, the plurality of second camera modules 308 may have different properties (e.g., angles of view) or functions, and includes, for example, a dual camera or a triple camera. The plurality of second camera modules 308 may include a plurality of camera modules including lenses having different angles of view, and the electronic device 101 may control the camera modules to change the angles of view of the camera modules operated therein based on a user's selection. The plurality of second camera modules 308 may include at least one of a wide-angle camera, a telephoto camera, a color camera, a monochrome camera, or an infrared (IR) camera (e.g., a time of flight (TOF) camera or a structured light camera). In some embodiments, the IR camera may be operated as at least a portion of a sensor module. The light-emitting module 309 (e.g., a flash) may include a light source for the plurality of second camera modules 308. The light-emitting module 309 may include, for example, an LED or a xenon lamp.

The input module 310 includes, for example, one or more key input devices. The one or more key input devices are located, for example, in an opening provided in the side surface 210C. In some embodiments, the electronic device 101 may not include some or all of the key input devices, and the not included key input devices may be implemented as soft keys by using the display 301. The positions or number of input modules 310 may vary, and in some embodiments, the input modules 310 may each include at least one sensor module.

The first connection terminal module (e.g., a first connector module or a first interface terminal module) 311 includes, for example, a first connector (or a first interface terminal) located inside the electronic device 101, and a first connector hole provided in the side surface 210C to correspond to the first connector. The second connection terminal module (e.g., a second connector module or a second interface terminal module) 312 includes, for example, a second connector (or a second interface terminal) located inside the electronic device 101, and a second connector hole provided in the side surface 210C to correspond to the second connector. The electronic device 101 may transmit and/or receive power and/or data to and from an external electronic device electrically connected to the first connector or the second connector. In an embodiment, the first connector may include a universal serial bus (USB) connector or a high-definition multimedia interface (HDMI) connector. In an embodiment, the second connector may include an audio connector (e.g., a headphone connector or an earset connector). The positions or number of connection terminal modules may vary without being limited to the illustrated example.

Figure 4:
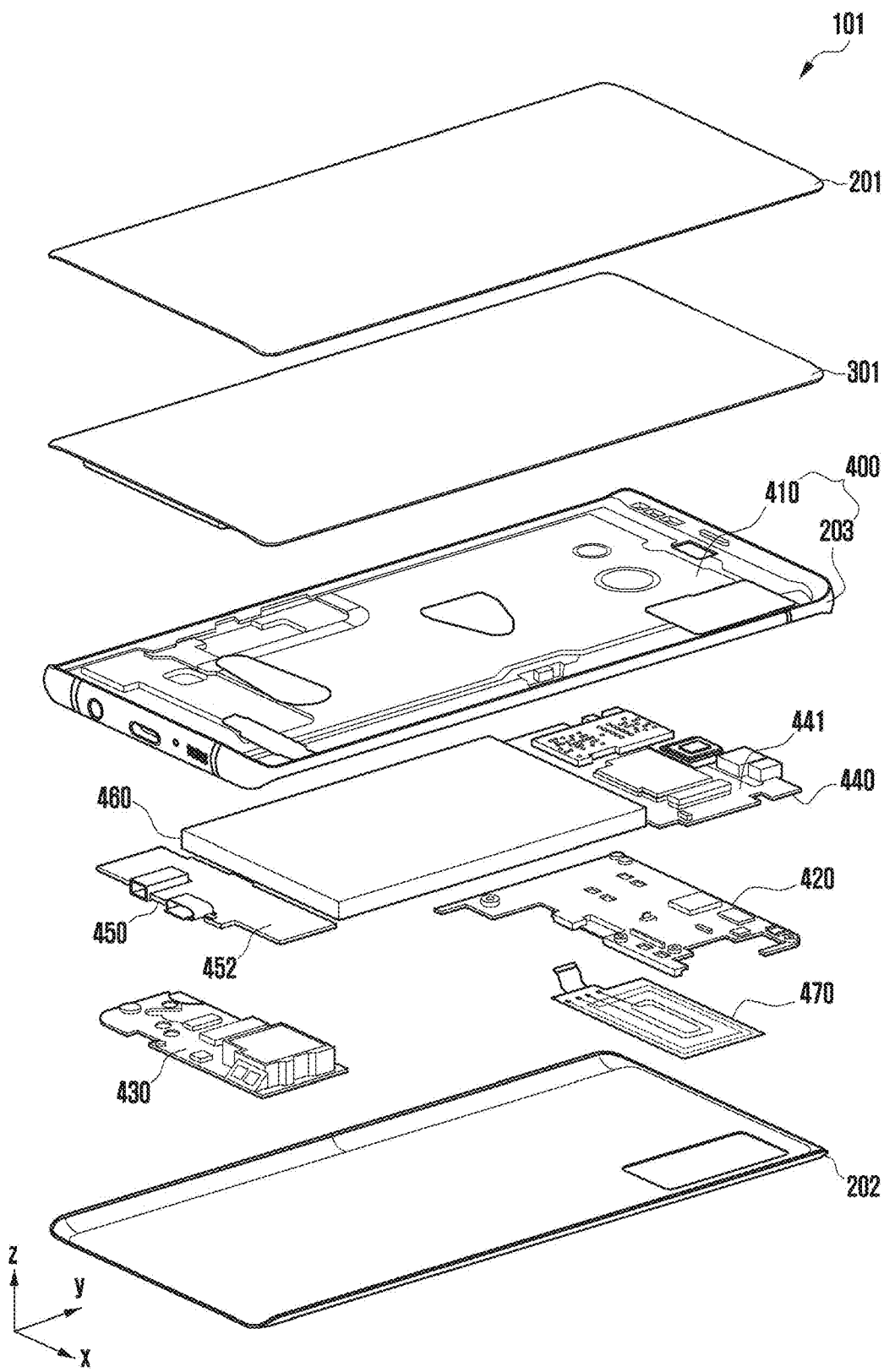
FIG. 4 is an exploded view of the electronic device of FIG. 2 according to an embodiment of the disclosure.

FIG. 4 is an exploded view of the electronic device 101 of FIG. 2 according to an embodiment of the disclosure.

Referring to FIG. 4, in an embodiment, the electronic device 101 may include a front surface plate 201, a rear surface plate 202, a side surface bezel structure 203, a first support member 410, a second support member 420, a third support member 430, a display 301, a first substrate assembly 440, a second substrate assembly 450, a battery 460, or an antenna structure 470. In some embodiments, in the electronic device 101, at least one of the above-mentioned components (e.g., the second support member 420 or the third support member 430) may be omitted, or other components may be additionally included.

For example, the first support member 410 is disposed inside the electronic device 101 and connected to the side surface bezel structure 203, or may be integrally formed with the side surface bezel structure 203. The first support member 410 is made of, for example, a metal material and/or a non-metal material (e.g., polymer). In an embodiment, a conductive portion included in the first support member 410 may serve as an electromagnetic shield for the display 301, the first substrate assembly 440, and/or the second substrate assembly 450. The first support member 410 and the side surface bezel structure 203 may be referred to as a front case 400. The first support member 410 is a portion of the front case 400 on which components, such as the display 301, the first substrate assembly 440, the second substrate assembly 450, or the battery 460, are disposed, and may contribute to the durability or rigidity (e.g., torsional rigidity) of the electronic device 101. Hereinafter, the first support member 410 may be referred to as a support structure (e.g., a bracket or a mounting plate).

The display 301 is located, for example, between the support structure (i.e., first support member 410) and the front surface plate 201, and may be disposed on one surface of the support structure (i.e., first support member 410). The first substrate assembly 440 and the second substrate assembly 450 may be located, for example, between the support structure (i.e., first support member 410) and the rear surface plate 202, and may be disposed on the other surface of the support structure (i.e., first support member 410). The battery 460 is located, for example, between the support structure (i.e., first support member 410) and the rear surface plate 202, and may be disposed on the support structure (i.e., first support member 410).

According to an embodiment, the first substrate assembly 440 may include a first printed circuit board 441 (e.g., a printed circuit board (PCB) or a printed circuit board assembly (PBA)). The first substrate assembly 440 may include various electronic components electrically connected to the first printed circuit board 441. The electronic components may be disposed on the first printed circuit board 441 or may be electrically connected to the first printed circuit board 441 via an electrical path such as a cable or a flexible printed circuit board (FPCB). Referring to FIGS. 2 and 3, the electronic components includes, for example, a second microphone included in the second audio module 303, a second speaker included in the fourth audio module 305, a sensor module 306, a first camera module 307, a plurality of second camera modules 308, a light-emitting module 309, or an input module 310.

According to an embodiment, the second substrate assembly 450 may be located to be spaced apart from the first substrate assembly 440 with the battery 460 interposed therebetween when viewed from above the front surface plate 201 (e.g., when viewed in the −z-axis direction). The second substrate assembly 450 may include a second printed circuit board 442 electrically connected to the first printed circuit board 441 of the first substrate assembly 440. The second substrate assembly 450 may include various electronic components electrically connected to the second printed circuit board 442. The electronic components may be disposed on the second printed circuit board 442 or may be electrically connected to the second printed circuit board 442 via an electrical path such as a cable or an FPCB. Referring to FIGS. 2 and 3, the above-described electronic components includes, for example, a first microphone (or a first microphone module) included in the first audio module 302, a first speaker included in the third audio module 304, a first connector included in the first connection terminal module 311, or a second connector included in the second connection terminal module 312.

According to some embodiments, the first substrate assembly 440 or the second substrate assembly 450 may include a main PCB, a slave PCB located to partially overlap the main PCB, and/or an interposer substrate between the main PCB and the slave PCB.

The battery 460 is a device configured to supply power to at least one component of the electronic device 101, and includes, for example, a non-rechargeable primary battery, a rechargeable secondary battery, or a fuel cell. The battery 460 may be integrally disposed inside the electronic device 101 or may be detachably disposed on the electronic device 101.

According to an embodiment, the second support member 420 may be located between the support structure (i.e., first support member 410) and the rear surface plate 202, and may be coupled to the support structure (i.e., first support member 410) by using a fastening element such as a bolt. At least a portion of the first substrate assembly 440 may be located between the support structure (i.e., first support member 410) and the second support member 420, and the second support member 420 may cover and protect the first substrate assembly 440. The third support member 430 may be located to be at least partially spaced apart from the second support member 420 with the battery 460 interposed therebetween when viewed from above the rear surface plate 202 (e.g., when viewed in the +z-axis direction). The third support member 430 may be located between the support structure (i.e., first support member 410) and the rear surface plate 202, and may be coupled to the support structure (i.e., first support member 410) by using a fastening element such as a bolt. At least a portion of the second substrate assembly 450 may be located between the support structure (i.e., first support member 410) and the third support member 430, and the third support member 430 may cover and protect the second substrate assembly 450. The second support member 420 and/or the third support member 430 may be made of a metal material and/or a non-metal material (e.g., polymer). In some embodiments, the second support member 420 may serve as an electromagnetic shield for the first substrate assembly 440, and the third support member 430 may serve as an electromagnetic shield for the second substrate assembly 450. In some embodiments, the second support member 420 and/or the third support member 430 may be referred to as a rear case.

According to some embodiments, a single substrate assembly including the first substrate assembly 440 and the second substrate assembly 450 may be implemented. For example, the substrate assembly includes a first portion and a second portion located to be spaced apart from each other with the battery 460 interposed therebetween when viewed from above the rear surface plate 202 (e.g., when viewed in the +z-axis direction), and a third portion extending between the battery 460 and the side surface bezel structure 203 and interconnecting the first portion and the second portion. In this case, a single support member including the second support member 420 and the third support member 430 may be implemented.

According to an embodiment, the antenna structure 470 may be located between the second support member 420 and the rear surface plate 202. In some embodiments, the antenna structure 470 may be located between the battery 460 and the rear surface plate 202. The antenna structure 470 may be implemented in the form of a film such as an FPCB. The antenna structure 470 may include at least one conductive pattern used as a loop-type radiator. For example, the at least one conductive pattern includes a planar spiral conductive pattern (e.g., a planar coil or a pattern coil). In an embodiment, at least one conductive pattern included in the antenna structure 470 may be electrically connected to a wireless communication circuit (or a wireless communication module) included in the first substrate assembly 440. For example, the at least one conductive pattern is utilized for short-range wireless communication such as near-field communication (NFC). As another example, the at least one conductive pattern may be utilized for magnetic secure transmission (MST) for transmitting and/or receiving a magnetic signal. In some embodiments, at least one conductive pattern included in the antenna structure 470 may be electrically connected to a power transmission/reception circuit included in the first substrate assembly 440. The power transmission/reception circuit may wirelessly receive power from an external electronic device or wirelessly transmit power to the external electronic device by using at least one conductive pattern. The power transmission/reception circuit may include a power management module and includes, for example, a power management integrated circuit (PMIC) or a charger integrated circuit (IC). The power transmission/reception circuit may charge the battery 460 by using power wirelessly received by using the conductive pattern.

According to an embodiment, the electronic device 101 has a bar-type or plate-type appearance, but the disclosure is not limited thereto. For example, the illustrated electronic device 101 is a portion of a foldable electronic device, a slidable electronic device, a stretchable electronic device, and/or a rollable electronic device.

The electronic device 101 may further include various components depending on the form in which it is provided. Although all of these components cannot be listed since the components are modified diversely depending on the convergence trend of electronic devices 101, components equivalent to the above-mentioned components may be further included in the electronic device 101. In various embodiments, specific components may be excluded from the above components or replaced with other components depending on the provided form of the electronic device.

Figure 5:
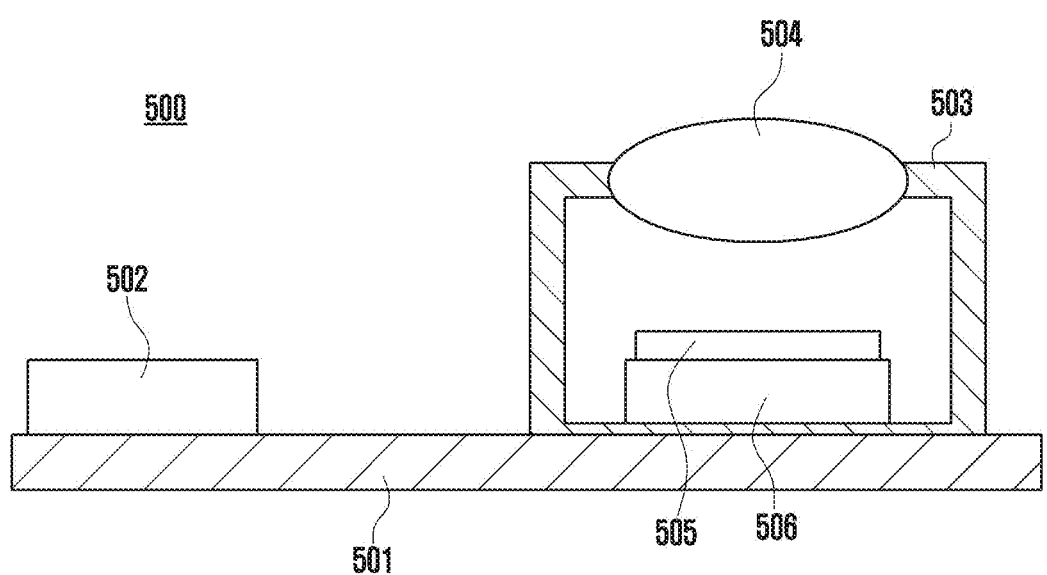
FIG. 5 is a view illustrating an optical fingerprint recognition device according to an embodiment of the disclosure.

FIG. 5 is a view illustrating an optical fingerprint recognition device according to an embodiment of the disclosure.

Referring to FIG. 5, an optical fingerprint recognition device 500 may include a printed circuit board (PCB) 501, a connector 502, a lens support 503, a lens 504, a filter element 505, and an image sensor 506.

The PCB 501 may be mounted with the connector 502, the lens support 503, the filter element 505, and the image sensor 506. At least a portion of the PCB 501 may be electrically connected to the image sensor 506. The connector 502 may transmit a signal acquired through the image sensor 506 to another electronic component (e.g., the processor 120) within the electronic device 101.

The lens support 503 may maintain the shape of the optical fingerprint recognition device 500. The lens support 503 may be disposed to be spaced apart from the image sensor 506 by a predetermined distance so that the lens 504 may condense light and project the light onto the image sensor 506.

The lens 504 may be mounted on the lens support 503 to be spaced apart from the image sensor 506 mounted on the PCB 501 by a predetermined distance.

The lens 504 may condense light and project the light onto the image sensor 506. The lens 504 may be a lens with a wide angle or a standard field of view (FOV).

The filter element 505 may cut off noise contained in the light condensed from the lens 504. For example, the filter element 505 is an active noise cutoff filter configured with a circuit, or a passive noise cutoff filter configured with a film. For example, the filter element 505 is an infrared cutoff filter.

The image sensor 506 may detect light and convert the light into an image-based electrical signal. The light transmitted through the lens 504 and condensed may have its noise components removed through the filter element 505 and be transmitted to the image sensor 506.

Figure 6:
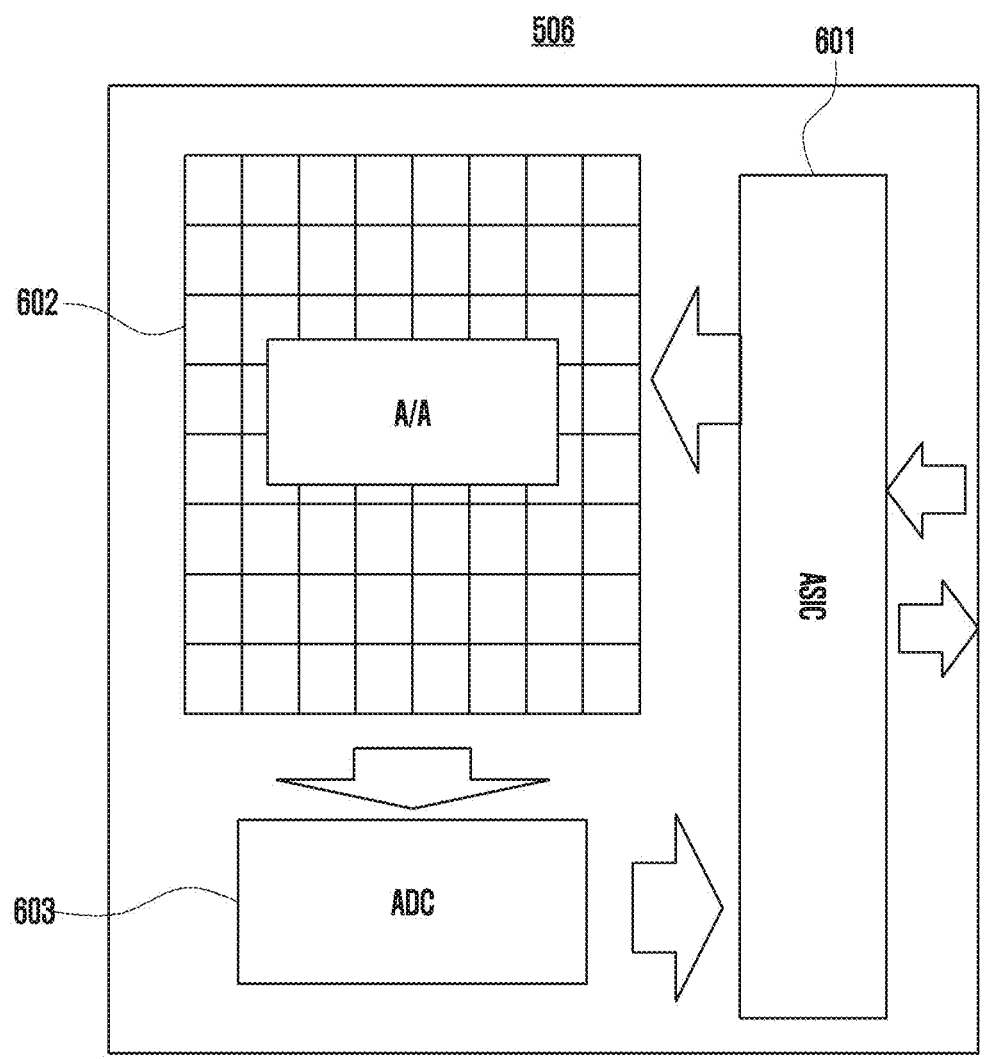
FIG. 6 is a view illustrating an image sensor according to an embodiment of the disclosure.

FIG. 6 is a view illustrating an image sensor according to an embodiment of the disclosure.

Referring to FIG. 6, the image sensor 506 may include a control circuit 601, a light detection circuit 602, and an ADC 603.

The light detection circuit 602 is, for example, a complementary metal oxide semiconductor (CMOS) image sensor or a charge-coupled device (CCD) image sensor.

The control circuit 601 is implemented as, for example, an application specific integrated circuit (ASIC) or a system-on chip (SoC).

In various embodiments, the control circuit 601 may be implemented as a field programmable gate array (FPGA).

The control circuit 601 may transmit an electrical signal obtained from the light detection circuit 602 to the outside or control the operation of the image sensor 506 based on a signal from an external device.

The control circuit 601 may be electrically connected to the light detection circuit 602 and the ADC 603 and control the operations of the light detection circuit 602 and the ADC 603.

The light detection circuit 602 may include an active area. The light detection circuit 602 may detect light and generate charges. In the light detection circuit 602, a plurality of photodiodes configured to detect light and generate charges may be arranged in an array.

The light detection circuit 602 may detect light and transmit a converted electrical signal to the ADC 603. The ADC 603 may be an analog-to-digital converter and convert the electrical signal received from the light detection circuit 602 into a digital signal and transmit the digital signal to the control circuit 601.

Figure 7:
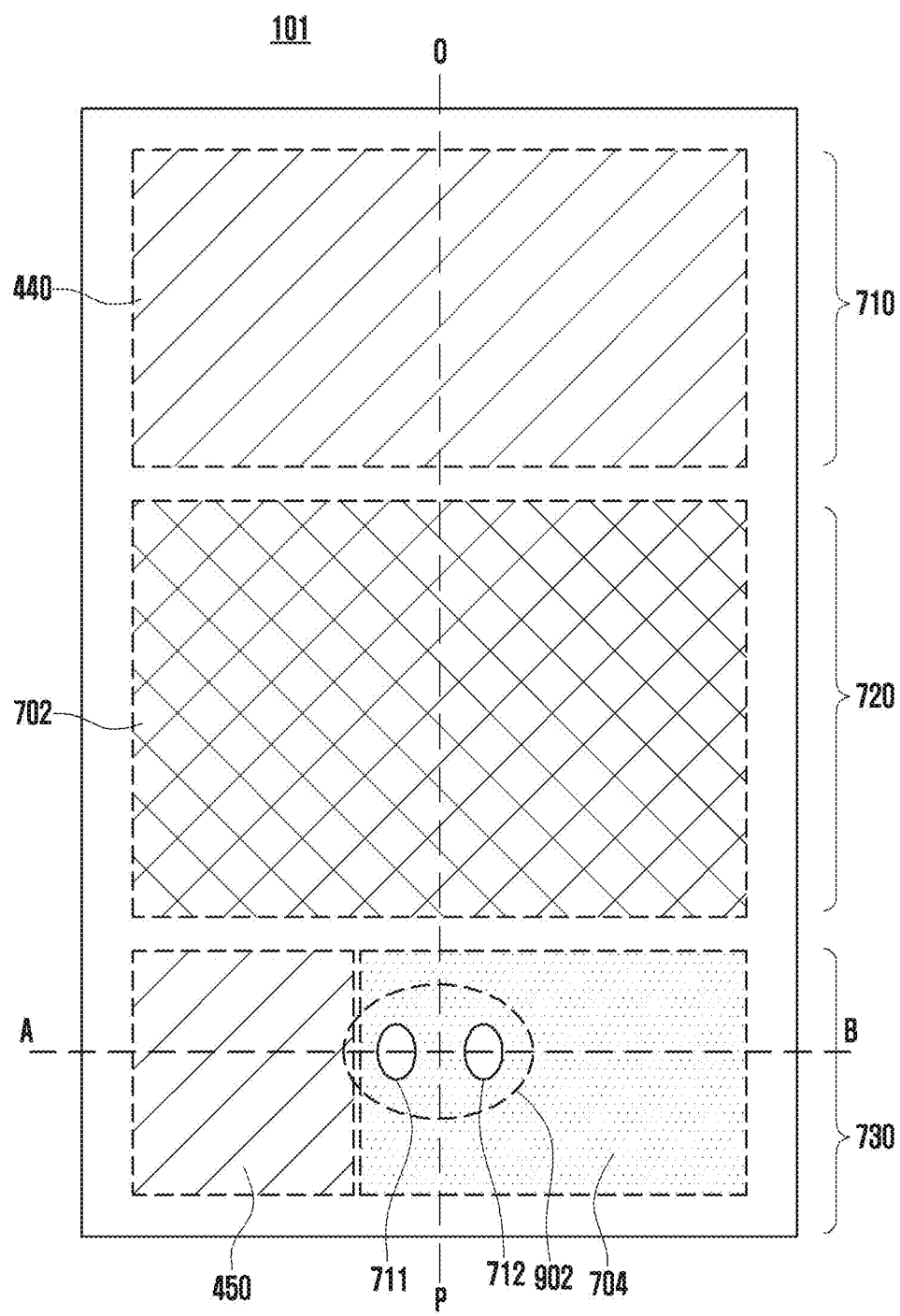
FIG. 7 is a view schematically illustrating a fingerprint recognition area of an electronic device according to an embodiment of the disclosure.

FIG. 7 is a view schematically illustrating a fingerprint recognition area of an electronic device according to an embodiment of the disclosure.

Referring to FIG. 7, the electronic device 101 may include a first substrate assembly 440, a battery 702, a second substrate assembly 450, and a speaker enclosure 704.

In an embodiment, the first substrate assembly 440 may include a processor (the processor 120 in FIG. 1), a communication module (the communication module 190 in FIG. 1), or memory (the memory 130 in FIG. 1). For example, the first substrate assembly 440 is a main board.

In an embodiment, the battery 702 may store power received in a wireless or wired manner and supply necessary power to the electronic device 101. In an embodiment, the battery 702 may be disposed between the first substrate assembly 440 and the second substrate assembly 450. The battery 702 is substantially the same as, for example, the battery 189 of FIG. 1.

In an embodiment, the second substrate assembly 450 may include circuitry necessary for the operation of the display module 160. For example, the second substrate assembly 450 is a display PCB.

In an embodiment, the first substrate assembly 440 and the second substrate assembly 450 may be electrically connected via an FPCB. The FPCB may include a power line capable of supplying power to the display module 160, a control line configured to transmit control signals for the display module 160, or a screen signal line configured to transmit signals related to data to be displayed on the display module 160.

In an embodiment, the electronic device 101 may include a first area 710, a second area 720, and a third area 730. The first area 710 may be an upper area of the electronic device 101, and the third area 730 may be a lower area of the electronic device 101. The second area 720 may be disposed between the first area 710 and the third area 730.

In an embodiment, a first circuit board may be disposed in the first area 710, the battery 702 may be disposed in the second area 720, and the second substrate assembly 450 and the speaker enclosure 704 may be disposed in the third area 730.

In an embodiment, the second substrate assembly 450 and the speaker enclosure 704 may be arranged side by side in a first axis (A-B axis) direction.

In an embodiment, the speaker enclosure 704 may vibrate and output sound from the rear of the speaker included in the electronic device 101.

In an embodiment, the low-frequency performance of the speaker may be improved in proportion to the size of the space of the speaker enclosure 704.

In an embodiment, the fingerprint recognition area 902 may be disposed in at least a partial area of the speaker enclosure 704.

In some embodiments, the fingerprint recognition area 902 may be disposed in a separate optical fingerprint recognition device and at least a partial area of the speaker enclosure 704.

In an embodiment, the electronic device 101 may be symmetrical about an axis of symmetry (O-P axis). The electronic device 101 may be horizontally symmetrical about the axis of symmetry (O-P axis). The fingerprint recognition area 902 may be disposed on the axis of symmetry (O-P axis) of the electronic device 101.

In an embodiment, the axis of symmetry (O-P axis) may coincide with the vertical direction of the electronic device 101. The first axis (A-B axis) may coincide with the horizontal direction of the electronic device 101.

In an embodiment, the fingerprint recognition area 902 may be disposed in the central portion of the third area 730.

In an embodiment, the fingerprint recognition area 902 may include a plurality of lenses 711 and 712. In an embodiment, the electronic device 101 may further include a plurality of lenses in addition to a first lens 711 and a second lens 712.

In an embodiment, the first lens 711 and the second lens 712 may be placed in the speaker enclosure 704.

In an embodiment, the first lens 711 and the second lens 712 may be arranged side by side in the first axis (A-B axis) direction. In an embodiment, the first lens 711 and the second lens 712 may be arranged side by side in the first axis (A-B axis) direction, but are not limited thereto and may be arranged away from the first axis (A-B axis).

The first lens 711 and the second lens 712 may be spaced apart by a predetermined distance from each other such that each lens may secure a field of view (FOV).

In an embodiment, the first lens 711 and the second lens 712 may condense light and project the light to the image sensor. The speaker enclosure 704 may perform the same role as the lens support 503 in FIG. 5.

Figure 8:
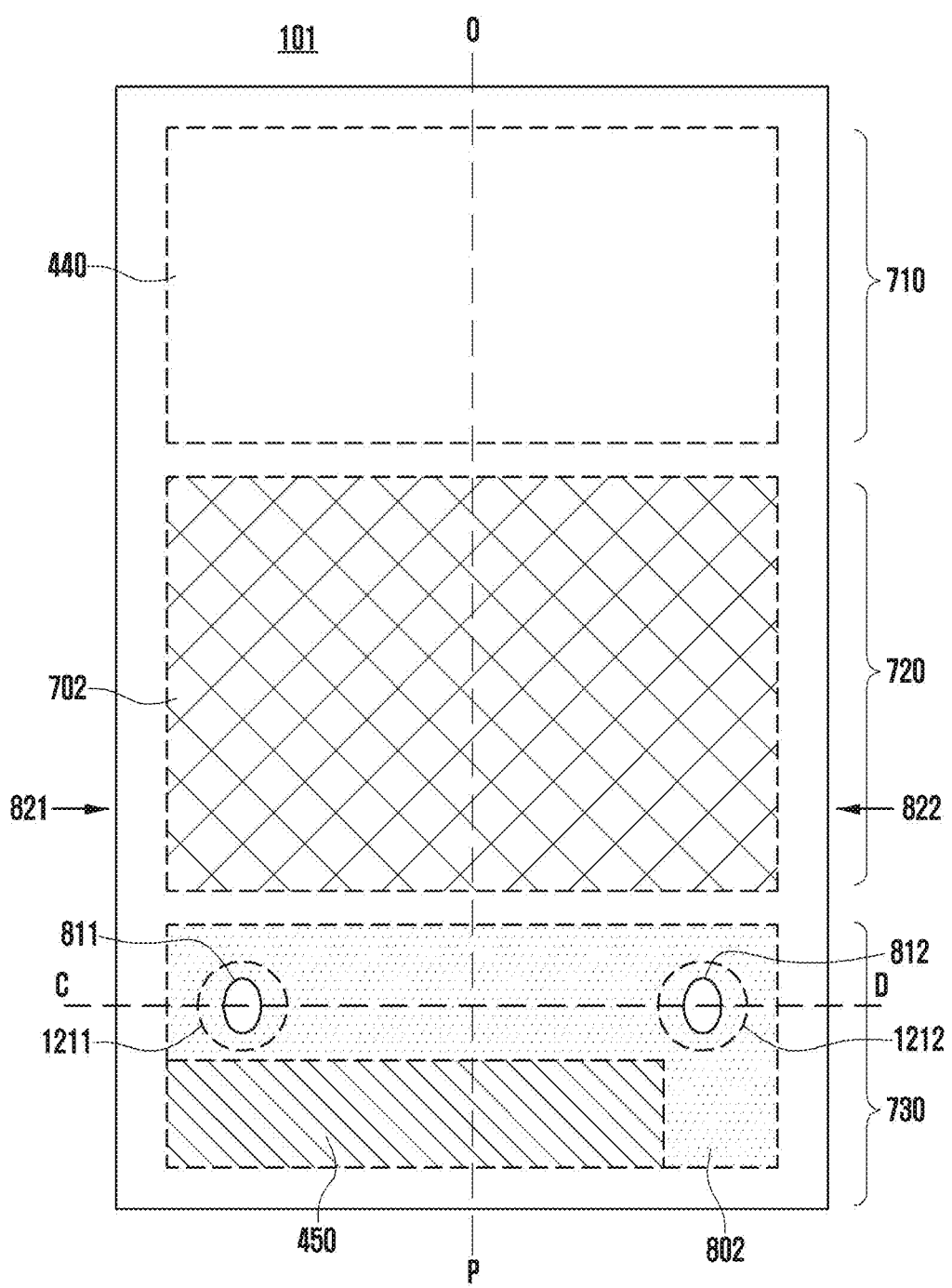
FIG. 8 is a view schematically illustrating fingerprint recognition areas of an electronic device according to an embodiment of the disclosure.

FIG. 8 is a view schematically illustrating fingerprint recognition areas of an electronic device according to an embodiment of the disclosure.

Referring to FIG. 8, fingerprint recognition areas 1211 and 1212 may differ from the fingerprint recognition area 902 of FIG. 7, and the remaining portions of the figures may be the same as or similar to each other.

The speaker enclosure 802 in FIG. 8 may vibrate and output sound from the rear of the speaker included in the electronic device 101.

In an embodiment, the speaker enclosure 802 may include a plurality of fingerprint recognition areas 1211 and 1212 in at least some areas.

In an embodiment, the electronic device 101 may be symmetrical about an axis of symmetry (O-P axis). The electronic device 101 may be horizontally symmetrical about the axis of symmetry (O-P axis).

In an embodiment, the axis of symmetry (O-P axis) may coincide with the vertical direction of the electronic device 101. A second axis (C-D axis) may coincide with the horizontal direction of the electronic device 101.

In an embodiment, the first fingerprint recognition area 1211 and the second fingerprint recognition area 1212 may be disposed in peripheral portions of the third area 730.

In an embodiment, the electronic device 101 may include a first side surface 821 and a second side surface 822 in the direction of the axis of symmetry (O-P axis). The first fingerprint recognition area 1211 may be placed adjacent to the first side surface 821, and the second fingerprint recognition area 1212 may be placed adjacent to the second side surface 822.

In an embodiment, the first fingerprint recognition area 1211 may include a third lens 811, and the second fingerprint recognition area 1212 may include a fourth lens 812. In an embodiment, the electronic device 101 may further include a plurality of lenses in addition to the third lens 811 and the fourth lens 812.

In an embodiment, the third lens 811 and the fourth lens 812 may be arranged side by side in the second axis (C-D axis) direction. In an embodiment, the third lens 811 and the fourth lens 812 may be arranged side by side in the second axis (C-D axis) direction, but are not limited thereto and may be arranged away from the second axis (C-D axis).

In an embodiment, the third lens 811 and the fourth lens 812 may condense light and project the light to the image sensor. The speaker enclosure 802 may perform the same role as the lens support 503 in FIG. 5.

Figure 9:
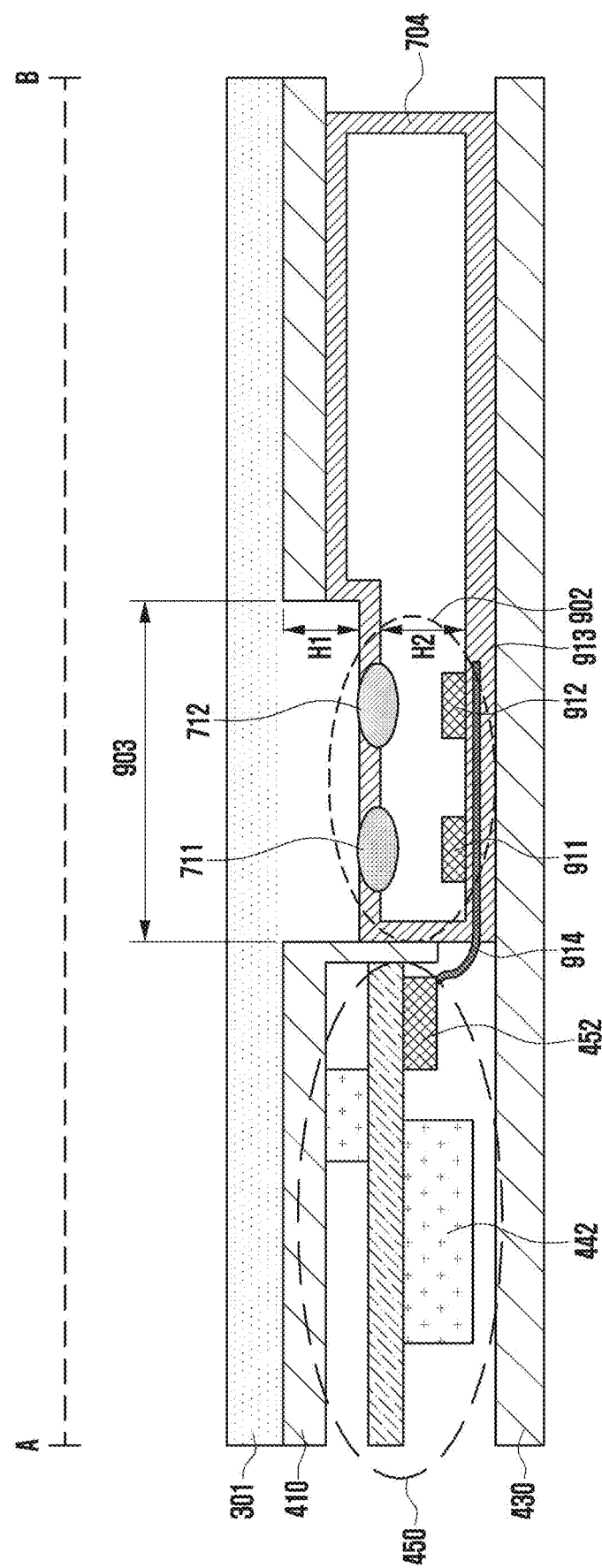
FIG. 9 is a cross-sectional view of the electronic device of FIG. 7, taken along a first axis (A-B axis) according to an embodiment of the disclosure.

FIG. 9 is a cross-sectional view of the electronic device of FIG. 7, taken along the first axis (A-B axis) according to an embodiment of the disclosure.

Referring to FIG. 9, the electronic device 101 may include a display 301, a first support member 410, a third support member 430, a second substrate assembly 450, and a speaker enclosure 704.

In an embodiment, the first support member 410 may be made of a metal material and/or a nonmetal (e.g., polymer) material. In an embodiment, a conductive portion included in the first support member 410 may serve as an electromagnetic shield for the display 301, the first substrate assembly 440, and the second substrate assembly 450.

In an embodiment, the first support member 410 is a portion on which components, such as the display 301, the first substrate assembly 440, the second substrate assembly 450, or the battery 460, are disposed, and may contribute to the durability or rigidity (e.g., torsional rigidity) of the electronic device 101. The first support member 410 may be referred to as a support structure (e.g., a bracket or a mounting plate).

In an embodiment, the first support member 410 may include an opening 903 at least in a portion thereof. The opening 903 may be an area where at least a portion of the first support member 410 is removed. The opening 903 may correspond to the fingerprint recognition area 902 included in at least a portion of the speaker enclosure 704.

In an embodiment, the third support member 430 may be made of a metal material and/or a nonmetal (e.g., polymer) material. The third support member 430 may serve as an electromagnetic shield for the second substrate assembly 450.

In an embodiment, the speaker enclosure 704 may be disposed between the first support member 410 and the third support member 430.

In an embodiment, the third support member 430 may support at least a portion of the speaker enclosure 704.

In an embodiment, the fingerprint recognition area 902 may include a first lens 711, a second lens 712, a first image sensor 911, a second image sensor 912, and a sensor circuit 913.

In an embodiment, the first image sensor 911 may be an integrated type including an active area and an ASIC. The second image sensor 912 may include an active area alone or an active area and an ASIC. When the second image sensor 912 includes only an active area, the first image sensor 911 may include a block that collects data from the second image sensor 912 and performs image processing.

In an embodiment, the first image sensor 911 may be a master image sensor, and the second image sensor 912 may be a slave image sensor.

In an embodiment, the first image sensor 911 and the second image sensor 912 may be independent image sensors.

In an embodiment, the first lens 711 and the second lens 712 may be spaced apart from the rear surface of the display 301 by a first distance H1. The first lens 711 may correspond to the first image sensor 911. The second lens 712 may correspond to the second image sensor 912. The first image sensor 911 and the second image sensor 912 may be spaced apart from the first lens 711 and the second lens 712 by a second distance H2. The distance between the display 301 and the lenses 711 and 712 (the first distance H1) and the distance between the lenses 711 and 712 and the image sensors 911 and 912 (the second distance H2) may be predetermined to correspond to image acquisition for fingerprint recognition. When molding the housing of the speaker enclosure 704, the height and/or housing thickness of the speaker enclosure 704 may be configured in consideration of the distance between the display 301 and the lenses 711 and 712 (the first distance H1) and the distance between the lenses 711 and 712 and the image sensors 911 and 912 (the second distance H2). The first lens 711 and the second lens 712 may be spaced apart by a predetermined distance from each other such that each lens may secure a field of view (FOV).

In an embodiment, the first lens 711 may condense light and project the light onto the first image sensor 911 and/or the second image sensor 912.

In an embodiment, the second lens 712 may condense light and project the light onto the first image sensor 911 and/or the second image sensor 912.

In an embodiment, the first image sensor 911 and the second image sensor 912 may detect light and convert the light into an image-based electrical signal. The first image sensor 911 and the second image sensor 912 may include the control circuit 601, the light detection circuit 602, and the ADC 603 illustrated in FIG. 6. The first image sensor 911 and the second image sensor 912 may transmit the detected image data to the sensor circuit 913 disposed in the speaker enclosure 704. The sensor circuit 913 may include a signal line capable of transmitting and receiving electrical signals, and may be electrically connected to the connector 452 disposed on the second substrate assembly 450.

In an embodiment, the second substrate assembly 450 may include a second printed circuit board 442 and a connector 452. The second substrate assembly 450 may include various electronic components electrically connected to the second printed circuit board 442.

In an embodiment, the sensor circuit 913 may be electrically connected to the connector 452 via an electrical path 914, such as a cable or FPCB.

In an embodiment, the connector 452 may transmit image data of the first image sensor 911 and the second image sensor 912 received from the sensor circuit 913 to a processor 120 or an image signal processor.

Figure 10:
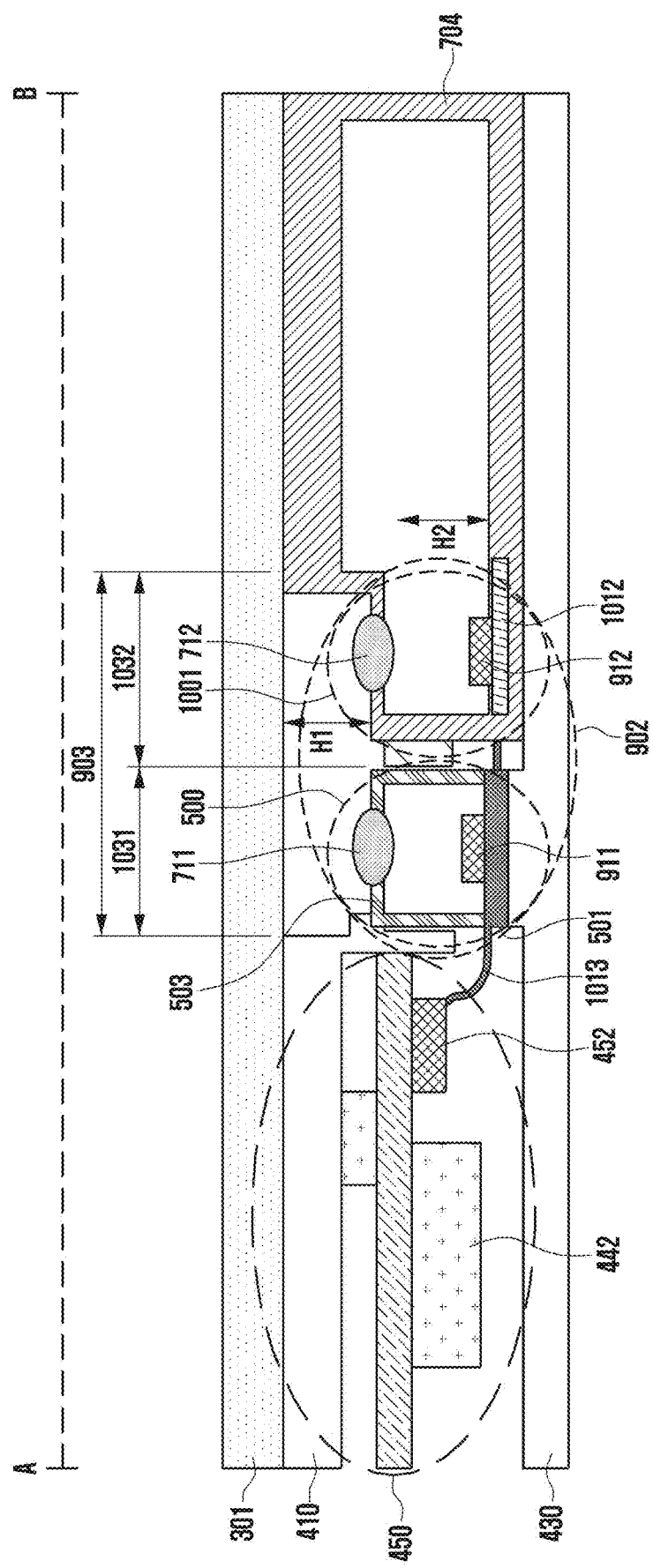
FIG. 10 is a cross-sectional view of the electronic device of FIG. 7, taken along the first axis (A-B axis) according to an embodiment of the disclosure.

FIG. 10 is a cross-sectional view of the electronic device of FIG. 7, taken along a first axis (A-B axis) according to an embodiment of the disclosure.

Referring to FIG. 10, the fingerprint recognition area 902 in FIG. 9 has the characteristic of being placed in the speaker enclosure 704, but the fingerprint recognition area 902 in FIG. 10 may be at least partially placed in the speaker enclosure 704 and at least partially placed in the optical fingerprint recognition device 500. FIGS. 9 and 10 differ only in the configuration of the fingerprint recognition area 902, and the remaining portions may be the same as or similar to each other.

In an embodiment, the first support member 410 may include an opening 903 at least in a portion thereof. The opening 903 may be an area where at least a portion of the first support member 410 is removed. In addition, the opening 903 may include a first opening area 1031 and a second opening area 1032. The first opening area 1031 and the second opening area 1032 may be continuously connected to form the opening 903. The first opening area 1031 may correspond to the optical fingerprint recognition device 500, and the second opening area 1032 may correspond to a fingerprint recognition structure 1001.

In an embodiment, the fingerprint recognition area 902 may include the optical fingerprint recognition device 500 and the fingerprint recognition structure 1001. The fingerprint recognition structure 1001 may be placed in the speaker enclosure 704.

In an embodiment, the optical fingerprint recognition device 500 may include a first lens 711, a first image sensor 911, a PCB 501, and a lens support 503. The optical fingerprint recognition device 500 of FIG. 10 may be the same as or similar to the optical fingerprint recognition device 500 of FIG. 5.

In an embodiment, the fingerprint recognition structure 1001 may include a second lens 712, a second image sensor 912, and a sensor circuit 1012.

In an embodiment, the first image sensor 911 may be an integrated type including an active area and an ASIC. The second image sensor 912 may include an active area alone or an active area and an ASIC. When the second image sensor 912 includes only an active area, the first image sensor 911 may include a block that collects data from the second image sensor 912 and performs image processing.

In an embodiment, the first image sensor 911 may be a master image sensor, and the second image sensor 912 may be a slave image sensor.

In an embodiment, the first image sensor 911 and the second image sensor 912 may be independent image sensors. In an embodiment, the first lens 711 included in the optical fingerprint recognition device 500 and the second lens 712 included in the fingerprint recognition structure 1001 may be spaced apart from the rear surface of the display 301 by a first distance H1. The first lens 711 may correspond to the first image sensor 911. The second lens 712 may correspond to the second image sensor 912.

In an embodiment, the first image sensor 911 included in the optical fingerprint recognition device 500 may be spaced apart from the first lens 711 by a second distance H2. The second image sensor 912 included in the fingerprint recognition structure 1001 may be spaced apart from the second lens 712 by the second distance H2.

In an embodiment, the distance between the display 301 and the lenses 711 and 712 (the first distance H1) and the distance between the lenses 711 and 712 and the image sensors 911 and 912 (the second distance H2) may be predetermined to correspond to image acquisition for fingerprint recognition. When molding the housing of the speaker enclosure 704, the height and/or housing thickness of the speaker enclosure 704 may be configured in consideration of the distance between the display 301 and the lens 712 (the first distance H1) and the distance between the lens 712 and the image sensor 912 (the second distance H2).

In an embodiment, the optical fingerprint recognition device 500 may condense light through the first lens 711 and project the light onto the first image sensor 911. The fingerprint recognition structure 1001 may condense light through the second lens 712 and project the light onto the second image sensor 912.

In an embodiment, the first image sensor 911 and the second image sensor 912 may detect light and convert the light into an image-based electrical signal. The first image sensor 911 and the second image sensor 912 may include the control circuit 601, the light detection circuit 602, and the ADC 603 illustrated in FIG. 6. The first image sensor 911 may transmit the detected image data to the PCB 501 placed in the optical fingerprint recognition device 500. The second image sensor 912 may transmit the detected image data to the sensor circuit 1012 disposed in the speaker enclosure 704. The sensor circuit 1012 and the PCB 501 may include a signal line capable of transmitting and receiving electrical signals, and may be electrically connected to the connector 452 disposed on the second substrate assembly 450.

In an embodiment, the sensor circuit 1012 and the PCB 501 may be electrically connected to the connector 452 via an electrical path 1013, such as a cable or FPCB.

In an embodiment, the connector 452 may transmit image data of the first image sensor 911 and the second image sensor 912 received from the sensor circuit 1012 and the PCB 501 to a processor 120 or an image signal processor.

Figure 11:
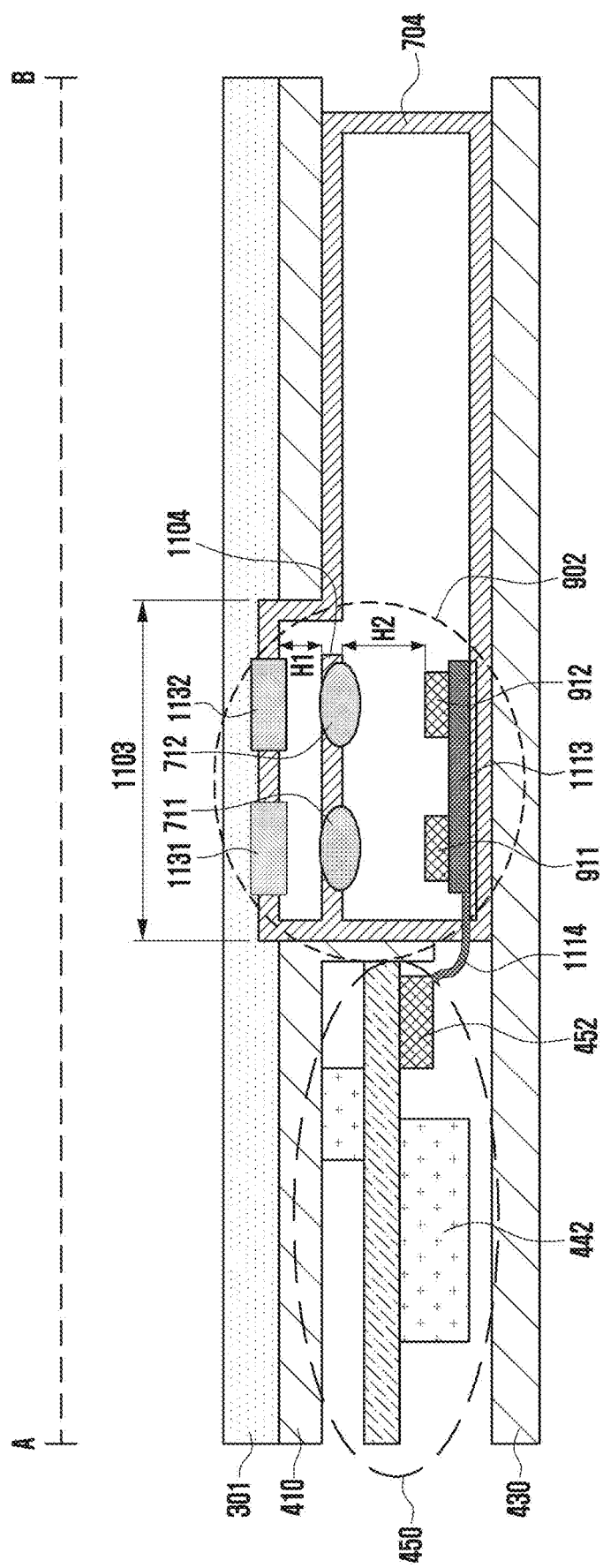
FIG. 11 is a cross-sectional view of the electronic device of FIG. 7, taken along the first axis (A-B axis) according to an embodiment of the disclosure.

FIG. 11 is a cross-sectional view of the electronic device of FIG. 7, taken along the first axis (A-B axis) according to an embodiment of the disclosure.

Referring to FIG. 11, the fingerprint recognition area 902 may further include a plurality of windows 1131 and 1132 and a lens stand 1104 compared to the fingerprint recognition area 902 in FIG. 9. In the fingerprint recognition area 902 in FIG. 11, the speaker enclosure 704 may extend to the opening 903. When the speaker enclosure 704 extends to the opening 903, a space (or back volume) may be increased so that the low-range performance of the speaker may be improved.

FIGS. 9 and 11 differ only in the configuration of the fingerprint recognition area 902, and the remaining portions may be the same as or similar to each other.

In an embodiment, the fingerprint recognition area 902 may include a first window 1131, a second window 1132, a lens stand 1104, a first lens 711, a second lens 712, a first image sensor 911, a second image sensor 912, and a sensor circuit 1113.

In an embodiment, the speaker enclosure 704 may have the first window 1131 and the second window 1132 disposed in an area adjacent to the opening 903.

In an embodiment, the first image sensor 911 may be an integrated type including an active area and an ASIC. The second image sensor 912 may include an active area alone or an active area and an ASIC. When the second image sensor 912 includes only an active area, the first image sensor 911 may include a block that collects data from the second image sensor 912 and performs image processing.

In an embodiment, the first image sensor 911 may be a master image sensor, and the second image sensor 912 may be a slave image sensor.

In an embodiment, the first image sensor 911 and the second image sensor 912 may be independent image sensors. In an embodiment, the first window 1131 and the second window 1132 may be disposed on the rear surface of the display 301. The first window 1131 and the second window 1132 may have a transparent molding structure.

In an embodiment, the first window 1131 and the second window 1132 may be made of a transparent material such as tempered glass, glass, or ABS resin.

In an embodiment, the first lens 711 and the second lens 712 may be disposed on the lens stand 1104. The lens stand 1104 may have a structure that protrudes from a specific surface of the speaker enclosure 704 in a direction parallel to the display 301. The lens stand 1104 may not spatially separate the speaker enclosure 704. The lens stand 1104 may have a structure that protrudes from a specific surface of the speaker enclosure 704 and be at least partially separated from the speaker enclosure 704. The lens stand 1104 may have a structure that protrudes from a specific surface of the speaker enclosure 704, and may include a structure that is at least partially separated from the speaker enclosure 704, thereby increasing a space (or back volume) in the speaker enclosure 704.

In an embodiment, the first lens 711 and the second lens 712 may be spaced apart from the first window 1131 and the second window 1132 by a first distance H1. The first lens 711 may correspond to the first image sensor 911 and/or the second image sensor 912. The second lens 712 may correspond to the first image sensor 911 and/or the second image sensor 912.

In an embodiment, the first image sensor 911 and the second image sensor 912 may be spaced apart from the first lens 711 and the second lens 712 by a second distance H2.

In an embodiment, the distance between the windows 1131 and 1132 and the lenses 711 and 712 (the first distance H1) and the distance between the lenses 711 and 712 and the image sensors 911 and 912 (the second distance H2) may be predetermined to correspond to image acquisition for fingerprint recognition.

In an embodiment, the first window 1131 may correspond to the first lens 711. The second window 1132 may correspond to the second lens 712.

In an embodiment, the fingerprint recognition area 902 may condense, through the first lens 711, the light transmitted through the first window 1131 and project the light onto the first image sensor 911. The fingerprint recognition area 902 may condense, through the second lens 712, the light transmitted through the second window 1132 and project the light onto the second image sensor 912.

In an embodiment, the first image sensor 911 and the second image sensor 912 may detect light and convert the light into an image-based electrical signal. The first image sensor 911 and the second image sensor 912 may transmit the detected image data to the sensor circuit 1113 disposed in the speaker enclosure 704. The sensor circuit 1113 may include a signal line capable of transmitting and receiving electrical signals, and may be electrically connected to the connector 452 disposed on the second substrate assembly 450.

In an embodiment, the sensor circuit 1113 may be electrically connected to the connector 452 via an electrical path 1114, such as a cable or FPCB.

In an embodiment, the connector 452 may transmit image data of the first image sensor 911 and the second image sensor 912 received from the sensor circuit 1113 to a processor 120 or an image signal processor.

Figure 12:
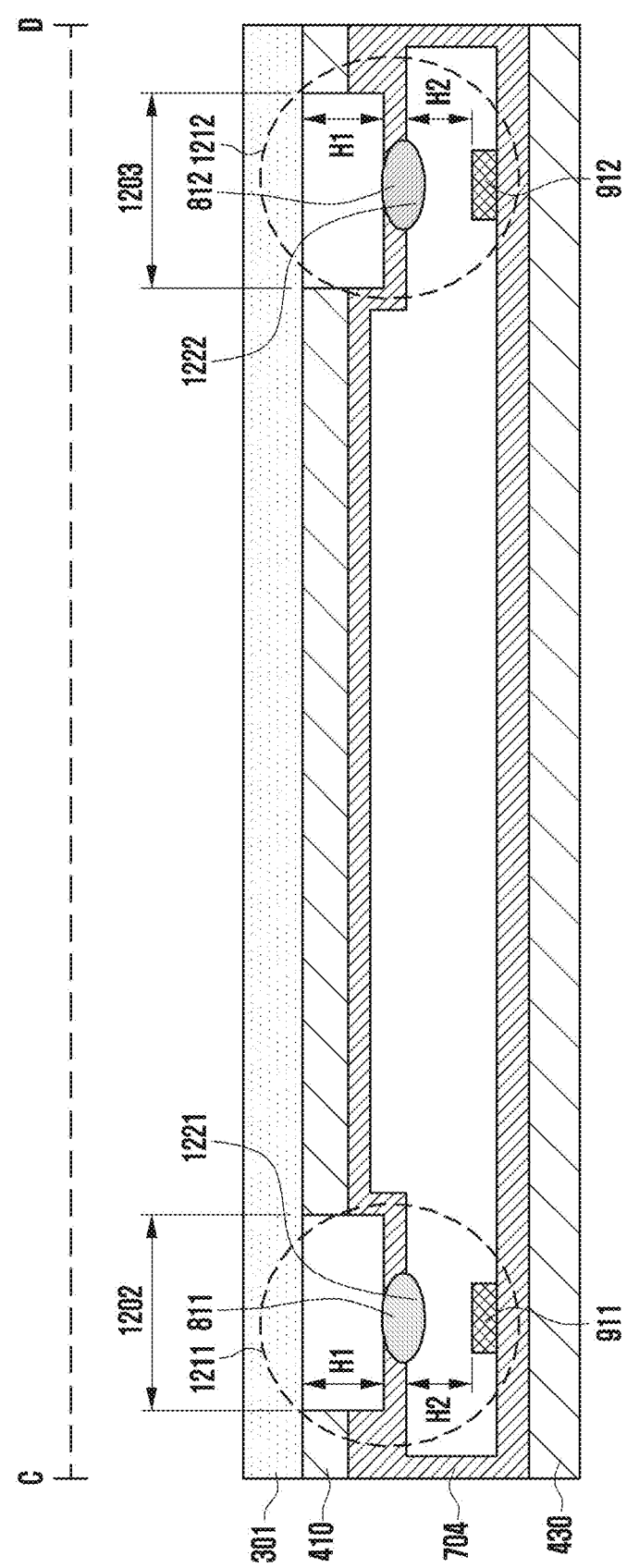
FIG. 12 is a cross-sectional view of the electronic device of FIG. 8, taken along a second axis (C-D axis) according to an embodiment of the disclosure.

FIG. 12 is a cross-sectional view of the electronic device of FIG. 8, taken along the second axis (C-D axis) according to an embodiment of the disclosure.

Referring to FIG. 12, the electronic device 101 may include a display 301, a first support member 410, a third support member 430, and a speaker enclosure 704. The electronic device 101 may include a first fingerprint recognition area 1211 and a second fingerprint recognition area 1212.

In an embodiment, the first support member 410 may include a first opening 1202 and a second opening 1203 in at least a portion thereof.

The first opening 1202 and the second opening 1203 may be areas where at least a portion of the first support member 410 is removed. The first opening 1202 and the second opening 1203 may correspond to the first fingerprint recognition area 1211 and the second fingerprint recognition area 1212 included in at least a portion of the speaker enclosure 704. Referring to FIG. 8, the first fingerprint recognition area 1211 may be disposed adjacent to a first side surface 821 of the electronic device 101, and the second fingerprint recognition area 1212 may be disposed adjacent to a second side surface 822 of the electronic device 101.

In an embodiment, the speaker enclosure 704 may be disposed between the first support member 410 and the third support member 430.

In an embodiment, the third support member 430 may support at least a portion of the speaker enclosure 704.

In an embodiment, the first fingerprint recognition area 1211 may include a third lens 811 and a third image sensor 1221. The second fingerprint recognition area 1212 may include a fourth lens 812 and a third image sensor 1221.

The first fingerprint recognition area 1211 may further include a sensor circuit (not illustrated) that is capable of transmitting data detected by the third image sensor 1221 to a processor 120 and/or an image signal processor, and the sensor circuit (not illustrated) may be disposed in the speaker enclosure 704 below the third image sensor 1211.

The second fingerprint recognition area 1212 may further include a sensor circuit (not illustrated) that is capable of transmitting data detected by a fourth image sensor 1222 to a processor 120 and/or an image signal processor, and the sensor circuit (not illustrated) may be disposed in the speaker enclosure 704 below the fourth image sensor 1212.

In an embodiment, the third image sensor 1221 may be an integrated type including an active area and an ASIC. The fourth image sensor 1222 may include an active area alone or an active area and an ASIC. When the third image sensor 1221 includes only an active area, the first image sensor 911 may include a block that collects data from the fourth image sensor 1222 and performs image processing.

In an embodiment, the third image sensor 1221 may be a master image sensor, and the fourth image sensor 1222 may be a slave image sensor.

In an embodiment, the third image sensor 1221 and the fourth image sensor 1222 may be independent image sensors.

In an embodiment, the third lens 811 and the fourth lens 812 may be spaced apart from the rear surface of the display 301 by a first distance H1. The third lens 811 may correspond to the third image sensor 1221. The fourth lens 812 may correspond to the fourth image sensor 1222. The third image sensor 1221 and the fourth image sensor 1222 may be spaced apart from the third lens 811 and the fourth lens 812 by a second distance H2. The distance between the display 301 and the lenses 811 and 812 (the first distance H1) and the distance between the lenses 811 and 812 and the image sensors 1221 and 1222 (the second distance H2) may be predetermined to correspond to image acquisition for fingerprint recognition. When molding the housing of the speaker enclosure 704, the height and/or housing thickness of the speaker enclosure 704 may be configured in consideration of the distance between the display 301 and the lenses 811 and 812 (the first distance H1) and the distance between the lenses 811 and 812 and the image sensors 1221 and 1222 (the second distance H2).

In an embodiment, the third lens 811 may condense light and project the light onto the third image sensor 1221.

In an embodiment, the fourth lens 812 may condense light and project the light onto the fourth image sensor 1222.

In an embodiment, the third image sensor 1221 and the fourth image sensor 1222 may detect light and convert the light into an image-based electrical signal. The third image sensor 1221 and the fourth image sensor 1222 may include the control circuit 601, the light detection circuit 602, and the ADC 603 illustrated in FIG. 6.

Figure 13:
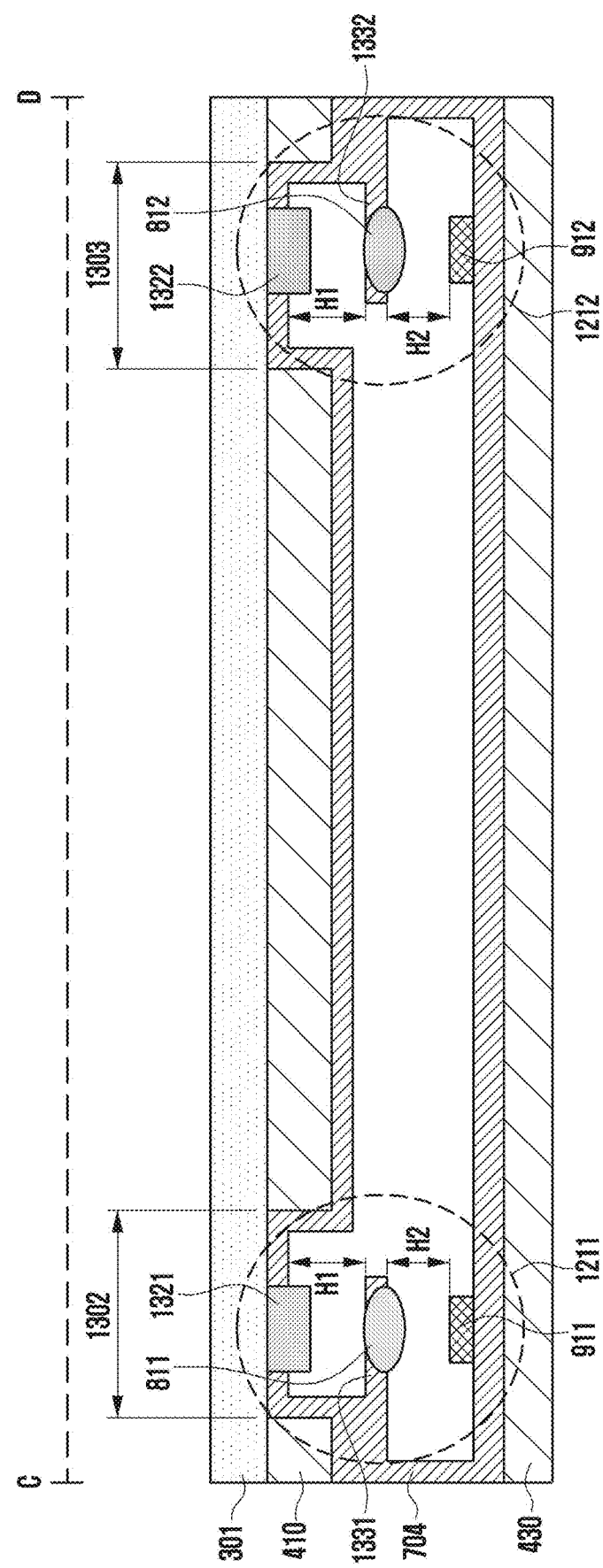
FIG. 13 is a cross-sectional view of the electronic device of FIG. 8, taken along the second axis (C-D axis) according to an embodiment of the disclosure.

FIG. 13 is a cross-sectional view of the electronic device 101 of FIG. 8, taken along the second axis (C-D axis) according to an embodiment of the disclosure.

Referring to FIG. 13, compared to the first fingerprint recognition area 1211 and the second fingerprint recognition area 1212 in FIG. 12, the first fingerprint recognition area 1211 and the second fingerprint recognition area 1212 in FIG. 13 may further include a plurality of windows 1321 and 1322 and a plurality of lens stands 1331 and 1332. In the first fingerprint recognition area 1211 and the second fingerprint recognition area 1212 in FIG. 13, the speaker enclosure 704 may extend to the first opening 1302 and the second opening 1303. When the speaker enclosure 704 extends to the first opening 1202 and the second opening 1203, the space (or back volume) may be increased so that the low-range performance of the speaker may be improved.

In an embodiment, the electronic device 101 may include a display 301, a first support member 410, a third support member 430, and a speaker enclosure 704.

In an embodiment, the first support member 410 may include a first opening 1202 and a second opening 1203 in at least a portion thereof.

In an embodiment, the first opening 1202 and the second opening 1203 may be areas where at least a portion of the first support member 410 is removed. The first opening 1202 and the second opening 1203 may correspond to the first fingerprint recognition area 1211 and the second fingerprint recognition area 1212 included in at least a portion of the speaker enclosure 704. Referring to FIG. 8, the first fingerprint recognition area 1211 may be disposed adjacent to a first side surface 821 of the electronic device 101, and the second fingerprint recognition area 1212 may be disposed adjacent to a second side surface 822 of the electronic device 101.

In an embodiment, the speaker enclosure 704 may be disposed between the first support member 410 and the third support member 430.

In an embodiment, the third support member 430 may support at least a portion of the speaker enclosure 704.

In an embodiment, the first fingerprint recognition area 1211 may include a first lens stand 1331, a third window 1321, a third lens 811, and a third image sensor 1221. The first fingerprint recognition area 1212 may include a second lens stand 1332, a fourth window 1322, a fourth lens 812, and a third image sensor 1221.

In an embodiment, the third image sensor 1221 may be an integrated type including an active area and an ASIC. The fourth image sensor 1222 may include an active area alone or an active area and an ASIC. When the third image sensor 1221 includes only an active area, the first image sensor 911 may include a block that collects data from the fourth image sensor 1222 and performs image processing.

In an embodiment, the third image sensor 1221 may be a master image sensor, and the fourth image sensor 1222 may be a slave image sensor.

In an embodiment, the third image sensor 1221 and the fourth image sensor 1222 may be independent image sensors.

In an embodiment, the first fingerprint recognition area 1211 may further include a sensor circuit (not illustrated) that is capable of transmitting data detected by the third image sensor 1221 to a processor 120 and/or an image signal processor, and the sensor circuit (not illustrated) may be disposed in the speaker enclosure 704 below the third image sensor 1211.

In an embodiment, the second fingerprint recognition area 1212 may further include a sensor circuit (not illustrated) that is capable of transmitting data detected by the fourth image sensor 1222 to a processor 120 and/or an image signal processor, and the sensor circuit (not illustrated) may be disposed in the speaker enclosure 704 below the fourth image sensor 1212.

In an embodiment, the speaker enclosure 704 may have a third window 1321 disposed in an area adjacent to the first opening 1202. In an embodiment, the speaker enclosure 704 may have a fourth window 1322 disposed in an area adjacent to the second opening 1203.

In an embodiment, the third window 1321 and the fourth window 1322 may be disposed on the rear surface of the display 301. The third window 1321 and the fourth window 1322 may have a transparent molding structure.

In an embodiment, the third window 1321 and the fourth window 1322 may be made of a transparent material such as tempered glass, glass, or ABS resin.

In an embodiment, the third lens 811 may be disposed on the first lens stand 1331. The fourth lens 812 may be disposed on the second lens stand 1332.

The first lens stand 1331 may have a structure that protrudes from a specific surface of the speaker enclosure 704 in a direction parallel to the display 301. The first lens stand 1331 may not spatially separate the speaker enclosure 704. The first lens stand 1331 may have a structure that protrudes from a specific surface of the speaker enclosure 704 and be at least partially separated from the speaker enclosure 704. The first lens stand 1331 may have a structure that protrudes from a specific surface of the speaker enclosure 704, and may include a structure that is at least partially separated from the speaker enclosure 704, thereby increasing a space (or back volume) in the speaker enclosure 704.

The second lens stand 1332 may have a structure that protrudes from a specific surface of the speaker enclosure 704 in a direction parallel to the display 301. The second lens stand 1332 may not spatially separate the speaker enclosure 704. The second lens stand 1332 may have a structure that protrudes from a specific surface of the speaker enclosure 704 and be at least partially separated from the speaker enclosure 704. The second lens stand 1332 may have a structure that protrudes from a specific surface of the speaker enclosure 704, and may include a structure that is at least partially separated from the speaker enclosure 704, thereby increasing a space (or back volume) in the speaker enclosure 704.

In an embodiment, the third lens 811 may be spaced apart from the third window 1321 by a first distance H1. The fourth lens 812 may be spaced apart from the fourth window 1322 by a first distance H1. The third lens 811 may correspond to the third image sensor 1221. The fourth lens 812 may correspond to the fourth image sensor 1222. The third image sensor 1221 and the fourth image sensor 1222 may be spaced apart from the third lens 811 and the fourth lens 812 by a second distance H2. The distance between the windows 1321 and 1322 and the lenses 811 and 812 (the first distance H1) and the distance between the lenses 811 and 812 and the image sensors 1221 and 1222 (the second distance H2) may be predetermined to correspond to image acquisition for fingerprint recognition. When molding the housing of the speaker enclosure 704, the height and/or housing thickness of the speaker enclosure 704 may be configured in consideration of the distance between the windows 1321 and 1322 and the lenses 811 and 812 (the first distance H1) and the distance between the lenses 811 and 812 and the image sensors 1221 and 1222 (the second distance H2).

In an embodiment, the third lens 811 may condense light and project the light onto the third image sensor 1221.

In an embodiment, the fourth lens 812 may condense light and project the light onto the fourth image sensor 1222.

In an embodiment, the third image sensor 1221 and the fourth image sensor 1222 may detect light and convert the light into an image-based electrical signal. The third image sensor 1221 and the fourth image sensor 1222 may include the control circuit 601, the light detection circuit 602, and the ADC 603 illustrated in FIG. 6.

An electronic device according to various embodiments disclosed herein may be any of various types of devices. The electronic device includes, for example, a portable communication device (e.g., a smartphone), a computer device, a portable multimedia device, a portable medical device, a camera, a wearable device, or a home appliance. The electronic device according to an embodiment disclosed herein is not limited to the above-described devices.

It should be understood that various embodiments of the disclosure and terms for describing the embodiments are not intended to limit the technical features disclosed herein to specific embodiments, and that the embodiments include various modifications, equivalents, and/or substitutions of the corresponding embodiments. In connection with the description made with reference to the drawings, similar or related components may be denoted by similar reference numerals. The singular form of a noun corresponding to an item may include one item or a plurality of items unless the relevant context clearly dictates otherwise. In the disclosure, each of phrases, such as "A or B", "at least one of A and B", "at least one of A or B", "A, B, or C", "at least one of A, B, and C", and "at least one of A, B, or C" may include any one of the items listed together in the corresponding phrase or all possible combinations of the items. Terms such as "$1^{st}$", "$2^{nd}$", "first," and "second" may simply be used to distinguish a given component from other corresponding components and do not limit the corresponding components in other aspects (e.g., importance or order). When one (e.g., a first) component is mentioned as being "coupled" or "connected" to another (e.g., a second) component, with or without the term "functionally" or "communicatively", it means that the one component may be connected to the other component directly (e.g., in a wired manner), wirelessly, or via a third component.

In various embodiments herein, the term "module" used herein may include a unit implemented in hardware, software, or firmware, and may be used interchangeably with terms such as "logic", "logic block", "component", "circuit", or the like. The module may be an integrally configured component or a minimum unit or a portion of the component, which performs one or more functions. For example, according to an embodiment, the module may be implemented in the form of an application-specific integrated circuit (ASIC).

Various embodiments disclosed herein may be implemented by software (e.g., the program 140) including one or more instructions stored in a storage medium (e.g., the internal memory 136 or the external memory 138) readable by a machine (e.g., the electronic device 101). For example, a processor (e.g., the processor 120) of a device (e.g., the electronic device 101) calls and executes at least one of the stored one or more instructions from the storage medium. This enables the device to be operated to perform at least one function in response to the at least one called instruction. The one or more instructions may include codes generated by a compiler or code capable of being executed by an interpreter. The machine-readable storage medium may be provided in the form of a non-transitory storage medium. The term "non-transitory" merely means that the storage medium is a tangible device and does not contain a signal (e.g., electromagnetic waves), and this term is not intended to distinguish a case where data is permanently stored on the storage medium and a case where data is temporarily stored.

According to an embodiment, a method according to various embodiments disclosed herein may be included and provided in a computer program product. The computer program product may be traded as a product between a seller and a purchaser. The computer program product may be distributed in the form of a machine-readable storage medium (e.g., compact disc read-only memory (CD-ROM)), or may be directly distributed through an application store (e.g., Play Store™) or directly between two user devices (e.g., smartphones), or may be distributed online (e.g., downloaded or uploaded). In the case of online distribution, at least part of the computer program product may be temporarily stored in or temporarily produced from a machine-readable storage medium such as a manufacturer's server, a server of an application store, or memory of a relay server.

According to various embodiments, each of the above-described components (e.g., module or program) may include a single object or a plurality of objects, and some of the plurality of objects may be separated and disposed in other components, respectively. According to various embodiments, one or more of the components or operations described above may be omitted, or one or more other components or operations may be added. Alternatively or additionally, a plurality of components (e.g., modules or programs) may be integrated into one component. In such a case, an integrated component may perform one or more functions of each of the plurality of components in the same or a similar manner as when performed by the corresponding one of the plurality of components prior to the integration. According to various embodiments, operations performed by a module, a program, or other components may be performed sequentially, in parallel, repetitively, or heuristically, one or more of the operations may be performed in a different order or omitted, or one or more other operations may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device including a biometric authentication device, the electronic device comprising:
   a display;
   a substrate assembly;
   a speaker enclosure including an inner space for vibrating and outputting sound and comprising at least a portion of a fingerprint recognition area;
   a first support member configured to support at least a portion of the display and the substrate assembly; and
   a second support member configured to support at least a portion of the speaker enclosure,
   wherein the fingerprint recognition area comprises:
      at least one lens disposed at a surface of the speaker enclosure and spaced apart from a rear surface of the display by a first distance, the surface of the speaker facing the rear surface of the display, and
      at least one image sensor disposed inside the speaker enclosure and spaced apart from the at least one lens by a second distance through the inner space of the speaker enclosure, and
   wherein the first support member comprises an opening corresponding to the fingerprint recognition area.

2. The electronic device of claim 1,
   wherein the at least one lens comprises a first lens and a second lens arranged side by side in a first axis direction, and
   wherein the first lens and the second lens are spaced apart from each other by a predetermined distance.

3. The electronic device of claim 2, wherein the at least one image sensor comprise:
   a first image sensor corresponding to the first lens and
   a second image sensor corresponding to the second lens.

4. The electronic device of claim 3, wherein the fingerprint recognition area comprises a sensor circuit configured to transmit image data detected by the first image sensor and the second image sensor to one or more processors.

5. The electronic device of claim 1, further comprising:
   an optical fingerprint recognition device,
   wherein at least a portion of the fingerprint recognition area is disposed on the speaker enclosure, and
   wherein at least a portion of the fingerprint recognition area is disposed on the optical fingerprint recognition device.

6. The electronic device of claim 5, wherein the optical fingerprint recognition device comprises:
   a third lens spaced apart from the rear surface of the display by the first distance;
   a lens support configured to support the third lens; and
   a third image sensor spaced apart from the third lens by the second distance.

7. The electronic device of claim 6, wherein the fingerprint recognition area comprises a sensor circuit configured to transmit image data detected by the third image sensor to one or more processors.

8. The electronic device of claim 1, further comprising:
   a plurality of windows disposed on the rear surface of the display; and
   a lens stand spaced apart from the plurality of windows by the first distance and protruding from a specific surface of the speaker enclosure.

9. The electronic device of claim 8, wherein the lens stand further comprises the at least one lens.

10. The electronic device of claim 9,
    wherein the plurality of windows comprise a first window and a second window disposed on the speaker enclosure, and
    wherein the at least one lens comprises:
       a fourth lens corresponding to the first window; and
       a fifth lens corresponding to the second window.

11. The electronic device of claim 10, wherein the at least one image sensor comprises:
    a fourth image sensor corresponding to the fourth lens; and
    a fifth image sensor corresponding to the fifth lens.

12. The electronic device of claim 11, wherein the fingerprint recognition area comprises a sensor circuit configured to transmit image data detected by the fourth image sensor and the fifth image sensor to one or more processors.

13. The electronic device of claim 1, further comprising:
   a first fingerprint recognition area adjacent to a first side surface of the electronic device; and
   a second fingerprint recognition area adjacent to a second side surface of the electronic device,
   wherein the first support member comprises:
      a first opening corresponding to the first fingerprint recognition area; and
      a second opening corresponding to the second fingerprint recognition area.

14. The electronic device of claim 13, wherein the first fingerprint recognition area further comprises:
   a sixth lens spaced apart from the rear surface of the display by the first distance; and
   a sixth image sensor corresponding to the sixth lens and spaced apart from the sixth lens by the second distance.

15. The electronic device of claim 13, wherein the second fingerprint recognition area further comprises:
   a seventh lens spaced apart from the rear surface of the display by the first distance; and
   a seventh image sensor corresponding to the seventh lens and spaced apart from the seventh lens by the second distance.

* * * * *